(12) United States Patent
Sasaki et al.

(10) Patent No.: US 7,663,839 B2
(45) Date of Patent: Feb. 16, 2010

(54) MAGNETIC HEAD FOR PERPENDICULAR MAGNETIC RECORDING WITH ENCASING LAYER

(75) Inventors: Yoshitaka Sasaki, Milpitas, CA (US);
Hiroyuki Itoh, Milpitas, CA (US);
Shigeki Tanemura, Milpitas, CA (US);
Takehiro Horinaka, Milpitas, CA (US);
Kazuo Ishizaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 593 days.

(21) Appl. No.: 11/129,377

(22) Filed: May 16, 2005

(65) Prior Publication Data

US 2006/0256483 A1 Nov. 16, 2006

(51) Int. Cl.
*G11B 5/31* (2006.01)
*G11B 5/39* (2006.01)

(52) U.S. Cl. .............................. 360/125.03; 360/125.13

(58) Field of Classification Search ................. 360/122, 360/125.01–125.03, 125.06–125.09, 125.1, 360/125.11–125.16, 125.19, 125.2, 125.22–125.29
See application file for complete search history.

(56) References Cited

U.S. PATENT DOCUMENTS

| | | | |
|---|---|---|---|
| 4,550,353 A | 10/1985 | Hirai et al. | |
| 4,656,546 A | 4/1987 | Mallory | |
| 5,726,839 A | 3/1998 | Shinohara et al. | |
| 5,793,578 A * | 8/1998 | Heim et al. | 360/125.4 |
| 5,883,760 A * | 3/1999 | Yamada et al. | 360/76 |
| 6,504,675 B1 | 1/2003 | Shukh et al. | |
| 6,710,973 B2 | 3/2004 | Okada et al. | |
| 6,809,899 B1 * | 10/2004 | Chen et al. | 360/125.13 |
| 7,006,326 B2 | 2/2006 | Okada et al. | |
| 7,133,252 B2 | 11/2006 | Takano et al. | |
| 7,227,720 B2 * | 6/2007 | Sasaki et al. | 360/125.12 |
| 7,248,437 B2 * | 7/2007 | Yazawa et al. | 360/125.12 |
| 7,375,925 B2 * | 5/2008 | Sasaki et al. | 360/123.02 |
| 7,468,864 B2 * | 12/2008 | Sasaki et al. | 360/125.12 |
| 2002/0034043 A1 | 3/2002 | Okada et al. | |
| 2002/0080524 A1 | 6/2002 | Takahashi et al. | |
| 2003/0151850 A1 | 8/2003 | Nakamura et al. | |
| 2003/0193744 A1 | 10/2003 | Takahashi et al. | |
| 2005/0041337 A1 | 2/2005 | Yazawa et al. | |

FOREIGN PATENT DOCUMENTS

JP A-59-104717 6/1984

(Continued)

*Primary Examiner*—Craig A. Renner
*Assistant Examiner*—Carlos E. Garcia
(74) *Attorney, Agent, or Firm*—Oliff & Berridge, PLC

(57) ABSTRACT

A pole layer has: a first portion having an end face located in a medium facing surface; and a second portion that is located farther from the medium facing surface than the first portion and has a thickness greater than that of the first portion. A surface of the first portion farther from a substrate is located closer to the substrate than a surface of the second portion farther from the substrate. The second portion has a front end face that couples the surface of the first portion farther from the substrate to the surface of the second portion farther from the substrate. A shield layer has a portion located between the front end face and the medium facing surface in a region closer to the substrate than the surface of the second portion farther from the substrate.

28 Claims, 21 Drawing Sheets

FOREIGN PATENT DOCUMENTS

| JP | A 07-161019 | 6/1995 |
| JP | A-2002-092821 | 3/2002 |
| JP | A 2002-133610 | 5/2002 |
| JP | A 2002-197615 | 7/2002 |
| JP | A 2003-242607 | 8/2003 |
| JP | A-2005-071429 | 3/2005 |

* cited by examiner

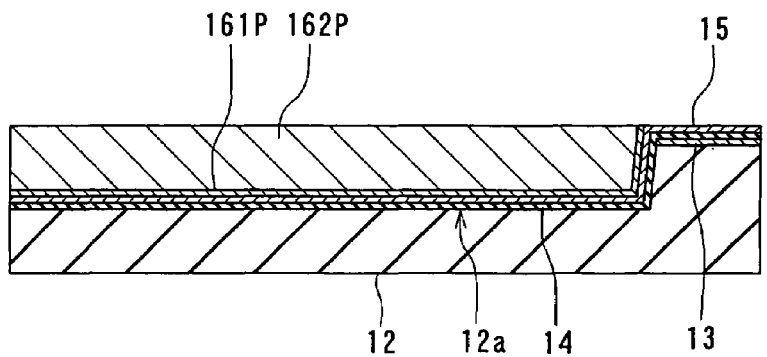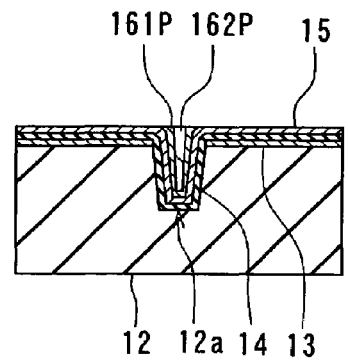
FIG. 7A  FIG. 7B
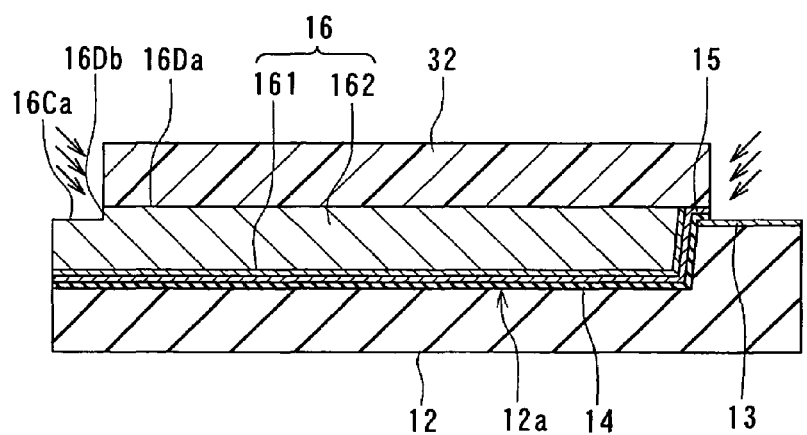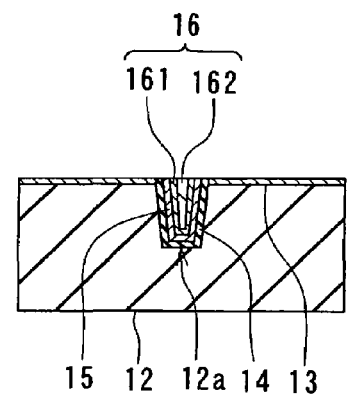
FIG. 8A  FIG. 8B

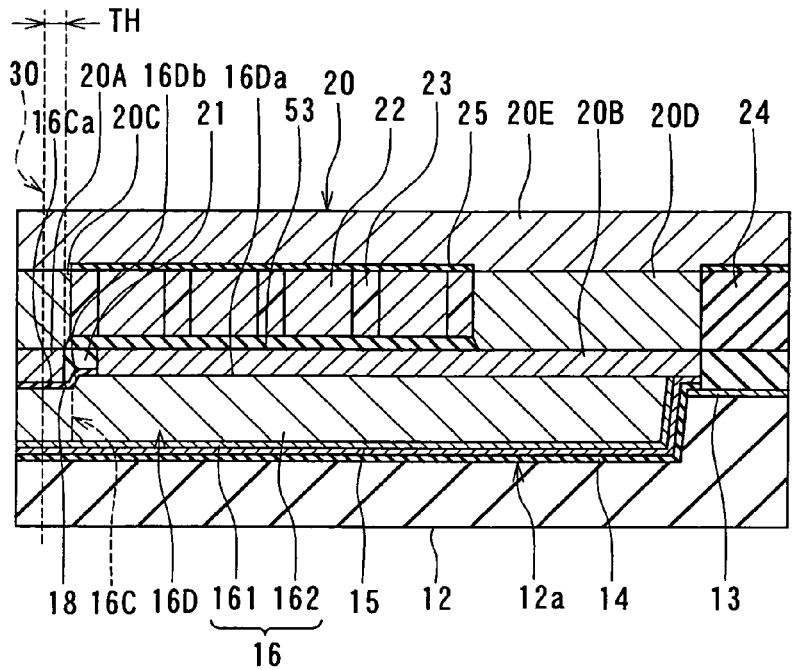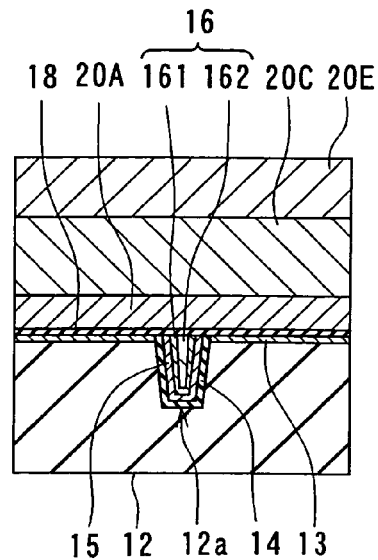
FIG. 14A
FIG. 14B
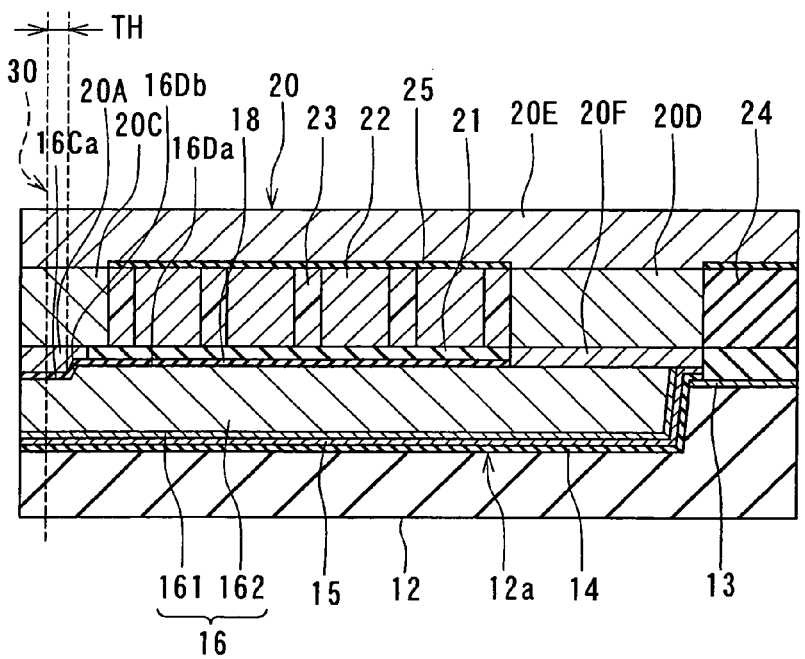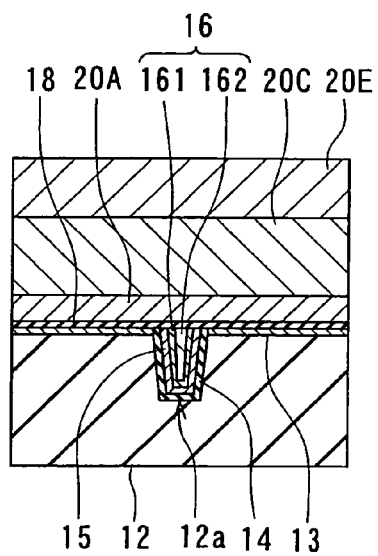
FIG. 15A
FIG. 15B

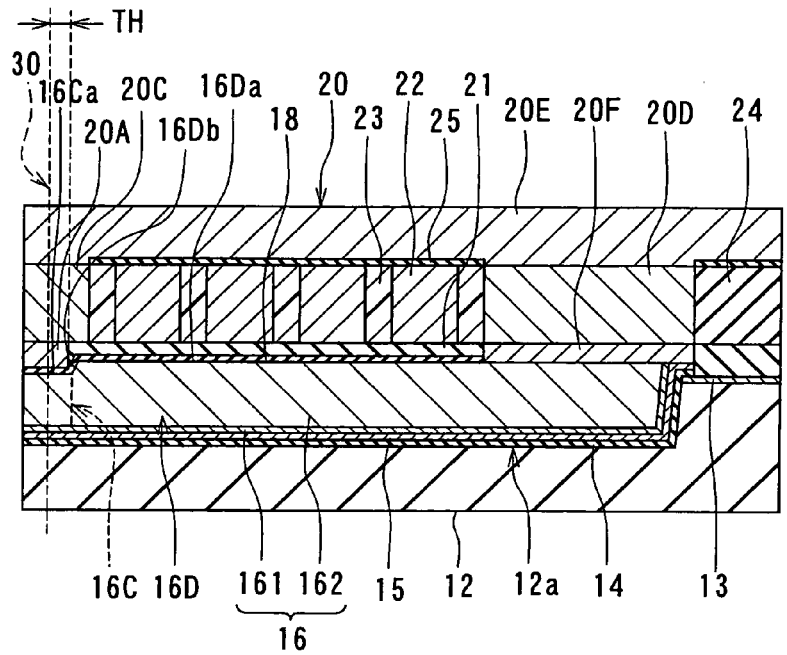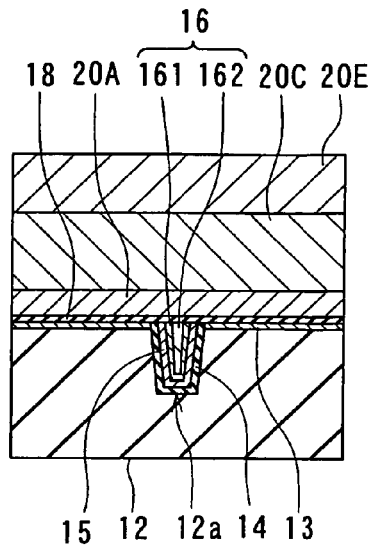
FIG. 16A     FIG. 16B
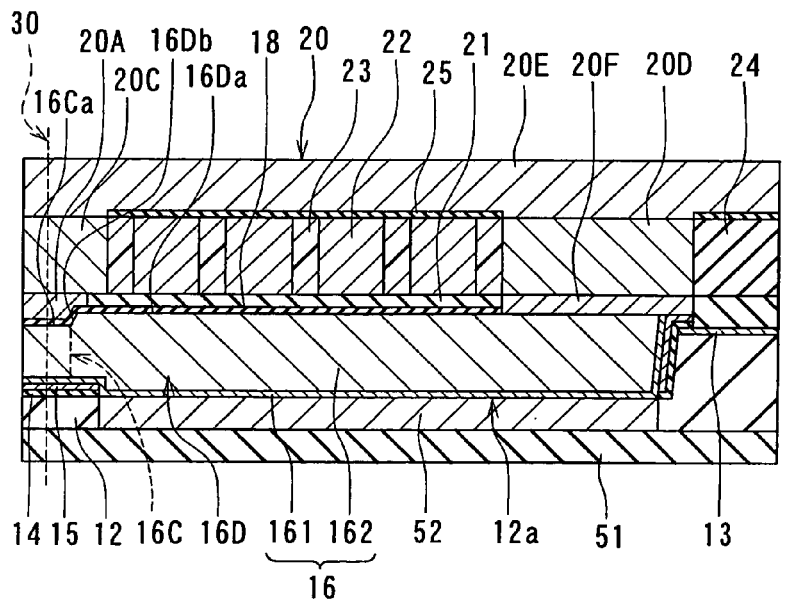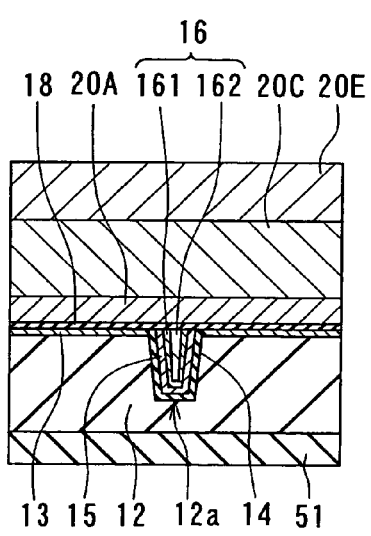
FIG. 17A     FIG. 17B

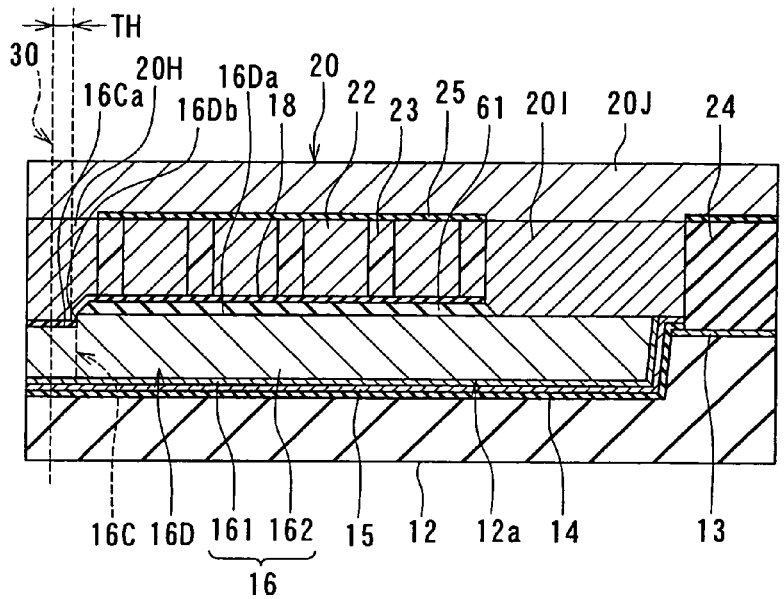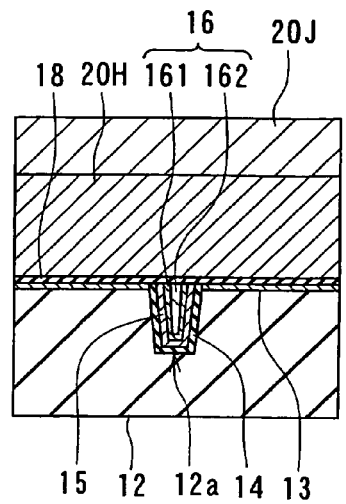
FIG. 22A  FIG. 22B
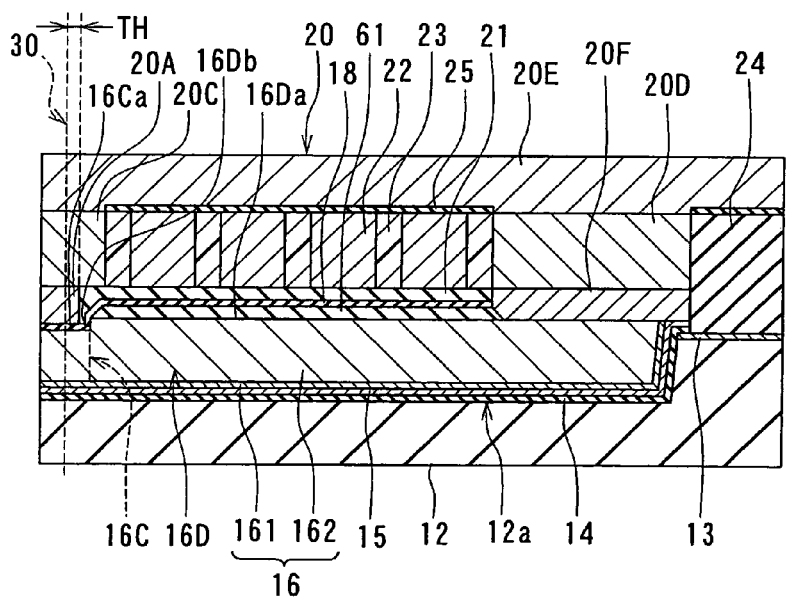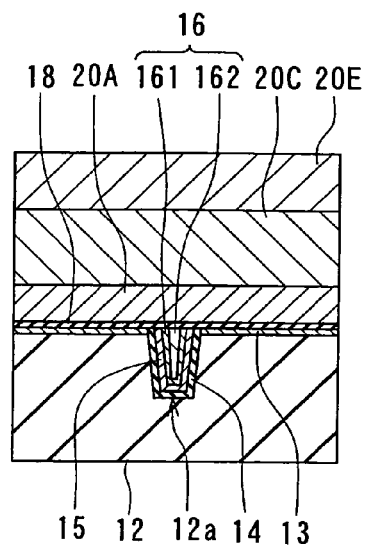
FIG. 23A  FIG. 23B

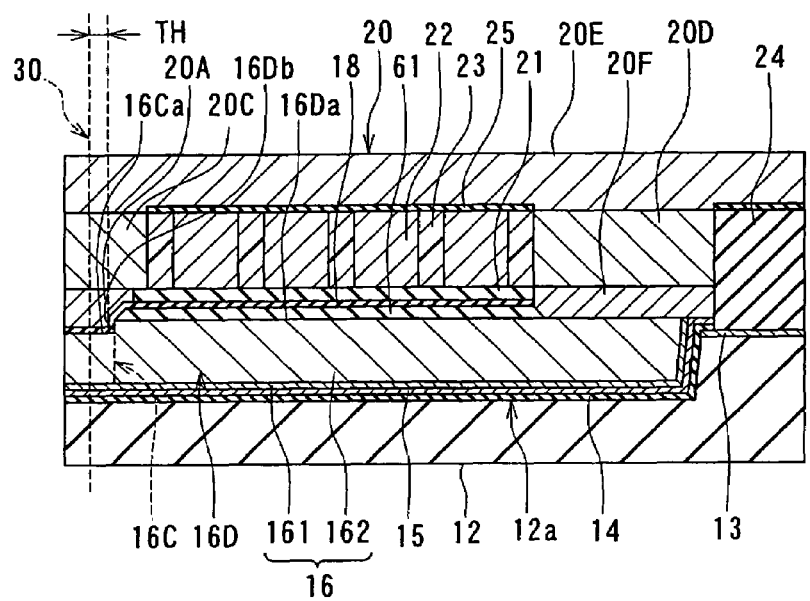 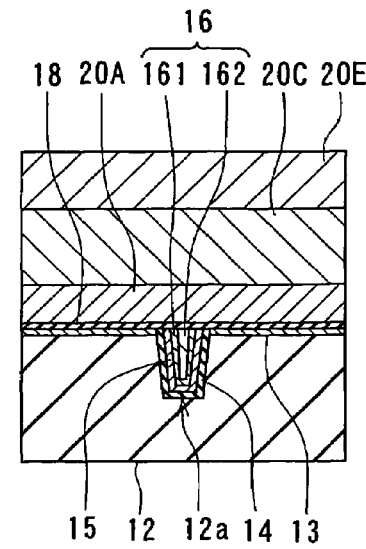
FIG. 24A  FIG. 24B
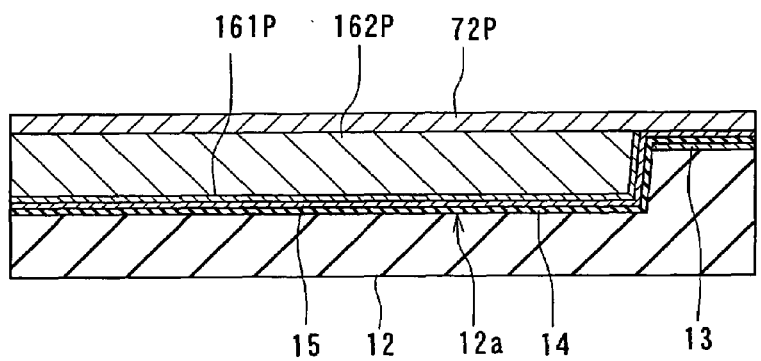 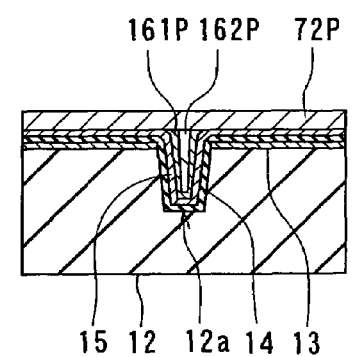
FIG. 25A  FIG. 25B

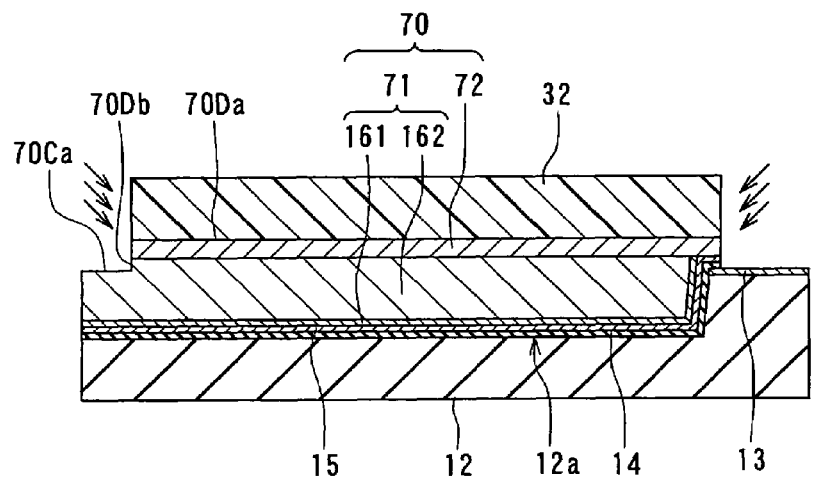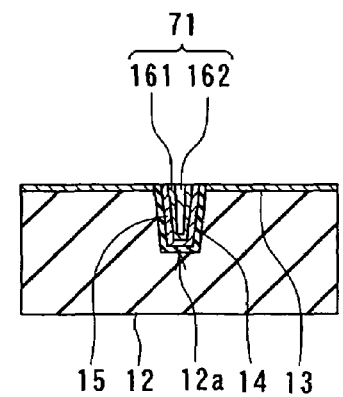
FIG. 26A  FIG. 26B
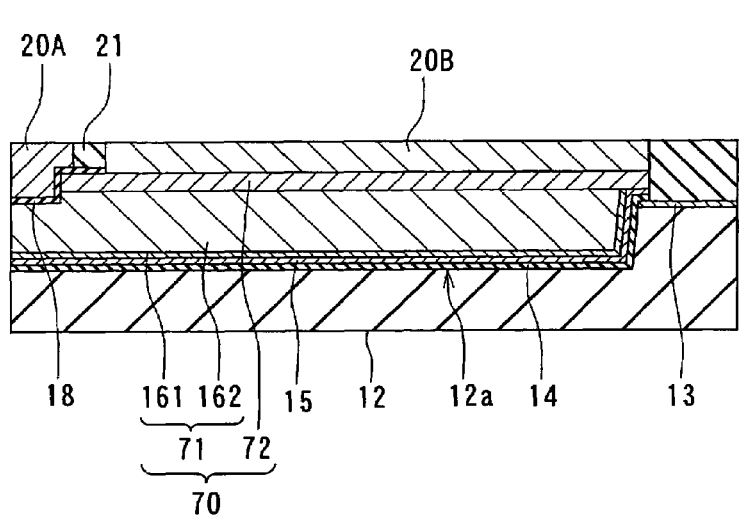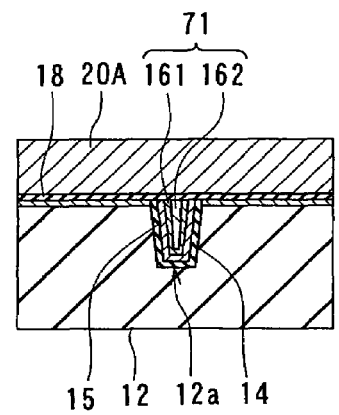
FIG. 27A  FIG. 27B

MAGNETIC HEAD FOR PERPENDICULAR MAGNETIC RECORDING WITH ENCASING LAYER

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are reduced. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in the U.S. Patent Application Publication No. US2003/0151850A1 and the U.S. Pat. No. 6,504,675B1, for example. According to this technique, the end face of the track width defining portion located in the medium facing surface is made to have a shape in which the side located backward in the direction of travel of the recording medium (that is, the side located on the air-inflow-end side of the slider) is shorter than the opposite side. Typically, in the medium facing surface of a magnetic head, the end farther from the substrate is located forward in the direction of travel of the recording medium (that is, on the air-outflow-end side of the slider). Therefore, the above-mentioned shape of the end face of the track width defining portion located in the medium facing surface is such a shape that the side closer to the substrate is shorter than the side farther from the substrate.

As a magnetic head for perpendicular magnetic recording, a magnetic head comprising a pole layer and a shield is known, as disclosed in the U.S. Pat. No. 4,656,546, for example. In the medium facing surface of this magnetic head, an end face of the shield is located forward of an end face of the pole layer along the direction of travel of the recording medium with a specific small space therebetween. Such a magnetic head will be hereinafter called a shield-type head. In the shield-type head, the shield prevents a magnetic flux from reaching the recording medium, the flux being generated from the end face of the pole layer and extending in directions except the direction orthogonal to the surface of the recording medium. The shield-type head achieves a further improvement in linear recording density.

The U.S. Pat. No. 5,726,839 discloses a technique for reducing the thickness of a portion of the pole layer (the main pole) near the medium facing surface such that this portion is thinner than the other portion of the pole layer.

The U.S. Patent Application Publication No. US2002/0034043A1 discloses a technique in which a portion of the pole layer (the main pole) near the medium facing surface is made to have a thickness that decreases as the distance from the medium facing surface decreases.

The U.S. Patent Application Publication No. US2002/0080524A1 and the U.S. Patent Application Publication No. US2003/0193744A1 disclose a technique in which a yoke layer thicker than a main pole layer is magnetically coupled to the main pole layer. An end face of the yoke layer closer to the medium facing surface is located at a distance from the medium facing surface.

Here, a combination of the main pole layer and the yoke layer that are disclosed in the U.S. Patent Application Publication No. US2002/0080524A1 and the U.S. Patent Application Publication No. US2003/0193744A1 is called a pole layer for convenience. It is a technique for making a portion of the pole layer near the medium facing surface have a thickness smaller than that of the other portion of the pole layer that is disclosed in each of the U.S. Pat. No. 5,726,839, the U.S. Patent Application Publication No. US2002/0034043A1, the U.S. Patent Application Publication No. US2002/0080524A1 and the U.S. Patent Application Publication No. US2003/0193744A1.

Consideration will now be given to a method of forming a pole layer having a track width defining portion with an end face that is located in the medium facing surface and that has a shape in which the side closer to the substrate is shorter than the side farther from the substrate as described above. It is frame plating that has been often used in prior art for forming such a pole layer. In a method of forming the pole layer by frame plating, an electrode film is first formed on a base of the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, the electrode film except a portion located below the pole layer is removed. Next, an insulating layer made of alumina, for example, is formed to cover the pole layer. Next, the insulating layer and the pole layer are polished by chemical mechanical polishing (hereinafter referred to as CMP), for example. Through the polishing, the top surface of the pole layer is flattened, and the thickness of the pole layer is controlled to be of a desired value.

It is difficult through the foregoing method of forming the pole layer to control the level at which polishing is stopped with precision. If the polishing is stopped at a level other than a desired level, the thickness of the pole layer is made other than a desired thickness, and the track width defined by the length of the above-mentioned side farther from the substrate is thereby made other than a desired value. Therefore, the foregoing method of forming the pole layer has a problem that it is difficult to control the track width with precision.

The U.S. Patent Application Publication No. US2003/0151850A1 discloses a technique in which the end face of the track width defining portion located in the medium facing surface is made to have a shape having a first portion and a second portion. The first portion has a width that continuously increases from an end on the air-inflow-end side to an end on the air-outflow-end side. The second portion is located on the air-outflow-end side of the first portion and has a uniform width that is equal to the width of the end of the first portion on the air-outflow-end side. This technique is capable of reducing variations in track width.

To solve the problems resulting from the skew, it is also effective to reduce the thickness of the track width defining portion taken in the medium facing surface. However, if the thickness of the entire pole layer is reduced, the cross-sectional area of the pole layer orthogonal to the direction in which the magnetic flux flows is reduced. As a result, it is impossible that the pole layer introduces a magnetic flux of great magnitude to the medium facing surface, and the overwrite property is thereby reduced.

In the U.S. Pat. No. 5,726,839, the U.S. Patent Application Publication No. US2002/0034043A1, the U.S. Patent Application Publication No. US2002/0080524A1 and the U.S. Patent Application Publication No. US2003/0193744A1, a portion of the pole layer near the medium facing surface is made to have a thickness smaller than that of the other portion of the pole layer. This results in a reduction in thickness of the track width defining portion taken in the medium facing surface, and thus allows the pole layer to introduce a magnetic flux of great magnitude to the medium facing surface. However, a problem that will now be described occurs in this case. In the above-described technique, it is inevitable that the pole layer has a portion in which the thickness varies. In this portion, it is likely that flux leakage from the pole layer occurs. Consequently, if the portion is close to the medium facing surface, the leakage flux from the portion reaches the medium facing surface and further leaks to the outside from the medium facing surface. As a result, the effective track width is increased and/or the above-mentioned problems resulting from the skew occur.

OBJECT AND SUMMARY OF THE INVENTION

It is a first object of the invention to provide a magnetic head for perpendicular magnetic recording that is capable of precisely controlling the thickness of the pole layer taken in the medium facing surface and capable of introducing a magnetic flux of great magnitude by the pole layer to the medium facing surface, and to provide a method of manufacturing such a magnetic head.

In addition to the above-mentioned first object, it is a second object of the invention to provide a magnetic head for perpendicular magnetic recording that is capable of preventing magnetic flux leaking halfway through the pole layer from further leaking to the outside from the medium facing surface, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; a shield layer having an end face located in the medium facing surface and having a portion that is away from the medium facing surface and coupled to the pole layer; a gap layer made of a nonmagnetic material and disposed between the pole layer and the shield layer; and a substrate on which the pole layer, the gap layer, the coil and the shield layer are stacked.

In the magnetic head of the invention, in the medium facing surface, the end face of the shield layer is located forward of the end face of the pole layer along the direction of travel of the recording medium with a specific space created by the thickness of the gap layer. The pole layer incorporates: a first portion having the end face located in the medium facing surface; and a second portion that is located farther from the medium facing surface than the first portion and has a thickness greater than that of the first portion. A surface of the first portion farther from the substrate is located closer to the substrate than a surface of the second portion farther from the substrate. The second portion has a front end face that couples the surface of the first portion farther from the substrate to the surface of the second portion farther from the substrate. The end face of the pole layer located in the medium facing surface has a first side close to the substrate, and a second side located opposite to the first side, the second side defining a track width. The shield layer incorporates a portion that is sandwiched between the front end face and the medium facing surface and that is located in a region closer to the substrate than the surface of the second portion farther from the substrate.

In the magnetic head of the invention, the end face of the pole layer located in the medium facing surface may have a width that decreases as the distance from the first side decreases. The first portion may include a portion having a width that does not change in accordance with the distance from the medium facing surface.

In the magnetic head of the invention, the gap layer may touch the surface of the first portion farther from the substrate, the front end face, and the surface of the second portion farther from the substrate. In this case, the shield layer may incorporate: a first layer disposed adjacent to the gap layer; and a second layer disposed on a side of the first layer opposite to the gap layer. The first layer may have a portion located above the second portion, and may have a bottom surface that bends to face toward the surface of the first portion farther from the substrate, the front end face, and the surface of the second portion farther from the substrate, with the gap layer disposed between the bottom surface of the first layer and each of the surface of the first portion, the front end face, and the surface of the second portion.

In the magnetic head of the invention, the shield layer may incorporate: a first layer disposed adjacent to the gap layer; and a second layer disposed on a side of the first layer opposite to the gap layer, and the first layer may be located only in a region above the first portion of the pole layer.

The magnetic head of the invention may further comprise a nonmagnetic film made of a nonmagnetic material and disposed on the surface of the second portion farther from the substrate. In addition, the shield layer may incorporate: a first layer disposed adjacent to the gap layer; and a second layer disposed on a side of the first layer opposite to the gap layer, and the first layer may have a portion located above the nonmagnetic film.

In the magnetic head of the invention, the pole layer may have a lower layer and an upper layer that are stacked, and the upper layer may have a saturation flux density that is greater than that of the lower layer. In this case, the front end face of the second portion may be formed to extend from the upper layer to the lower layer. When the pole layer has the lower and upper layers, the magnetic head may further comprise a nonmagnetic film made of a nonmagnetic material and disposed on the surface of the second portion farther from the substrate, the shield layer may incorporate: a first layer disposed adjacent to the gap layer; and a second layer disposed on a side of the first layer opposite to the gap layer, and the first layer may have a portion located above the nonmagnetic film.

The magnetic head of the invention may further comprise: an encasing layer made of a nonmagnetic material and having a groove that opens in the top surface thereof; and a nonmagnetic metal layer made of a nonmagnetic metal material, having a penetrating opening that is contiguous to the groove, and disposed on the top surface of the encasing layer, and at least a portion of the pole layer may be placed in the groove of the encasing layer and in the opening of the nonmagnetic metal layer. In this case, the end face of the pole layer located in the medium facing surface may have a first region and a second region connected to the first region and located farther from the substrate than the first region. In addition, the first region may have a width that decreases as the distance from the substrate decreases, the second region may have a uniform width that defines the track width, and, in the medium facing surface, the nonmagnetic metal layer may exist on both sides of the second region, the sides being opposed to each other in a direction of track width.

The magnetic head of the invention may further comprise a yoke layer touching the surface of the second portion farther from the substrate, and an end of the yoke layer closer to the medium facing surface may be located farther from the medium facing surface than a boundary between the front end face and the surface of the second portion farther from the substrate.

A first method of manufacturing a magnetic head for perpendicular magnetic recording of the invention comprises the steps of: forming the pole layer; forming the gap layer on the pole layer; forming the shield layer on the gap layer; and forming the coil.

In the first method of the invention, the step of forming the pole layer may include the steps of: forming a magnetic layer that will be formed into the pole layer by polishing and etching later; polishing the top surface of the magnetic layer; and etching a portion of the magnetic layer such that the first and second portions are formed and the magnetic layer is thereby formed into the pole layer. In this case, chemical mechanical polishing may be employed in the step of polishing, and ion beam etching may be employed in the step of etching.

The magnetic head manufactured by the first method of the invention may further comprise an encasing layer that is made of a nonmagnetic material, has a groove that opens in the top surface of the encasing layer, and accommodates a portion of the pole layer. In this case, the first method of the invention may further comprise the steps of: forming the encasing layer; and forming a polishing stopper layer around the groove in a region higher than the top surface of the encasing layer, the polishing stopper layer indicating a level at which polishing of the step of polishing is stopped. In the step of forming the magnetic layer, the magnetic layer may be formed such that the groove of the encasing layer is filled with the magnetic layer and that the top surface of the magnetic layer is located higher than the top surface of the polishing stopper layer. The step of polishing may be performed such that the top surface of the magnetic layer is polished until a portion of the magnetic layer located higher than the top surface of the polishing stopper layer is removed.

The step of forming the encasing layer may include the steps of: forming a nonmagnetic layer that will be formed into the encasing layer by forming the groove therein later; forming a nonmagnetic metal layer made of a nonmagnetic metal material on the top surface of the nonmagnetic layer, the nonmagnetic metal layer having a penetrating opening with a shape corresponding to a plane geometry of the pole layer; and forming the groove in the nonmagnetic layer by selectively etching a portion of the nonmagnetic layer exposed from the opening of the nonmagnetic metal layer so that the nonmagnetic layer is formed into the encasing layer. In the step of forming the polishing stopper layer, the polishing stopper layer may be formed in a region higher than the top surface of the nonmagnetic metal layer, and, in the step of forming the magnetic layer, the magnetic layer may be formed such that the groove of the encasing layer and the opening of the nonmagnetic metal layer are filled with the magnetic layer and that the top surface of the magnetic layer is located higher than the top surface of the polishing stopper layer. In the step of etching the portion of the magnetic layer, etching may be performed such that the second side is located at a height that falls within a range between a height at which the top surface of the nonmagnetic metal layer as initially formed is located and a height at which the bottom surface thereof is located.

The magnetic head manufactured by the first method of the invention may further comprise an encasing layer that is made of a nonmagnetic material, has a groove that opens in the top surface of the encasing layer, and accommodates a portion of the pole layer, and the end face of the pole layer located in the medium facing surface may have a first region and a second region connected to the first region and located farther from the substrate than the first region. In addition, the first region may have a width that decreases as the distance from the substrate decreases, and the second region may have a uniform width that defines the track width. In this case, the first method of the invention may further comprise the steps of: forming a nonmagnetic layer that will be formed into the encasing layer by forming the groove therein later; forming a nonmagnetic metal layer made of a nonmagnetic metal material on the top surface of the nonmagnetic layer, the nonmagnetic metal layer having a penetrating opening with a shape corresponding to the plane geometry of the pole layer; and forming the groove in the nonmagnetic layer by selectively etching a portion of the nonmagnetic layer exposed from the opening of the nonmagnetic metal layer, so that the nonmagnetic layer is formed into the encasing layer. In the step of forming the magnetic layer, the magnetic layer may be formed such that the groove of the encasing layer and the opening of the nonmagnetic metal layer are filled with the magnetic layer and that the top surface of the magnetic layer is located higher than the top surface of the nonmagnetic metal layer. In the step of etching the portion of the magnetic layer, etching may be performed such that the second side is located at a height that falls within a range between a height at which the top surface of the nonmagnetic metal layer as initially formed is located and a height at which the bottom surface thereof is located.

According to the first method of the invention, the pole layer may incorporate a lower layer and an upper layer that are stacked. In this case, the step of forming the pole layer may include the steps of: forming a magnetic layer for the lower layer that will be formed into the lower layer by polishing and etching later; polishing the top surface of the magnetic layer for the lower layer; forming a magnetic layer for the upper layer that will be the upper layer later on the magnetic layer for the lower layer polished; and etching a portion of the magnetic layer for the lower layer by using the magnetic layer for the upper layer as a mask, so that the magnetic layer for the lower layer is formed into the lower layer and the magnetic layer for the upper layer is formed into the upper layer. In this case, chemical mechanical polishing may be employed in the step of polishing, and the magnetic layer for the upper layer may be formed by frame plating. In addition, ion beam etching may be employed in the step of etching.

The magnetic head manufactured by the first method of the invention may further comprise an encasing layer that is made of a nonmagnetic material, has a groove that opens in the top surface of the encasing layer, and accommodates a portion of the pole layer. In this case, the method may further comprise the steps of: forming the encasing layer; and forming a polishing stopper layer around the groove in a region higher than the top surface of the encasing layer, the polishing stopper layer indicating a level at which polishing of the step of polishing is stopped. In the step of forming the magnetic layer for the lower layer, the magnetic layer for the lower layer may be formed such that the groove of the encasing layer is filled with the magnetic layer for the lower layer and that the top surface of the magnetic layer for the lower layer is located higher than the top surface of the polishing stopper layer. The step of polishing may be performed such that the top surface of the magnetic layer for the lower layer is polished until a portion of the magnetic layer for the lower layer located higher than the top surface of the polishing stopper layer is removed.

The step of forming the encasing layer may include the steps of: forming a nonmagnetic layer that will be formed into the encasing layer by forming the groove therein later; forming a nonmagnetic metal layer made of a nonmagnetic metal material on the top surface of the nonmagnetic layer, the nonmagnetic metal layer having a penetrating opening with a shape corresponding to the plane geometry of the pole layer; and forming the groove in the nonmagnetic layer by selectively etching a portion of the nonmagnetic layer exposed from the opening of the nonmagnetic metal layer, so that the nonmagnetic layer is formed into the encasing layer. In the step of forming the polishing stopper layer, the polishing stopper layer may be formed in a region higher than the top surface of the nonmagnetic metal layer. In the step of forming the magnetic layer for the lower layer, the magnetic layer for the lower layer may be formed such that the groove of the encasing layer and the opening of the nonmagnetic metal layer are filled with the magnetic layer for the lower layer and that the top surface of the magnetic layer for the lower layer is located higher than the top surface of the polishing stopper layer. In the step of etching the portion of the magnetic layer for the lower layer, etching may be performed such that the second side is located at a height that falls within a range between a height at which the top surface of the nonmagnetic metal layer as initially formed is located and a height at which the bottom surface thereof is located.

The magnetic head manufactured by the first method of the invention may further comprise an encasing layer that is made of a nonmagnetic material, has a groove that opens in the top surface of the encasing layer, and accommodates a portion of the pole layer. In addition, the end face of the pole layer located in the medium facing surface may have a first region and a second region connected to the first region and located farther from the substrate than the first region, the first region may have a width that decreases as the distance from the substrate decreases, and the second region may have a uniform width that defines the track width. In this case, the first method of the invention may further comprise the steps of: forming a nonmagnetic layer that will be formed into the encasing layer by forming the groove therein later; forming a nonmagnetic metal layer made of a nonmagnetic metal material on the top surface of the nonmagnetic layer, the nonmagnetic metal layer having a penetrating opening with a shape corresponding to the plane geometry of the pole layer; and forming the groove in the nonmagnetic layer by selectively etching a portion of the nonmagnetic layer exposed from the opening of the nonmagnetic metal layer, so that the nonmagnetic layer is formed into the encasing layer. In the step of forming the magnetic layer for the lower layer, the magnetic layer for the lower layer may be formed such that the groove of the encasing layer and the opening of the nonmagnetic metal layer are filled with the magnetic layer for the lower layer and that the top surface of the magnetic layer for the lower layer is located higher than the top surface of the nonmagnetic metal layer. In the step of etching the portion of the magnetic layer for the lower layer, etching may be performed such that the second side is located at a height that falls within a range between a height at which the top surface of the nonmagnetic metal layer as initially formed is located and a height at which the bottom surface thereof is located.

The first method of the invention may further comprise the step of forming a nonmagnetic film made of a nonmagnetic material and disposed on the surface of the second portion farther from the substrate. In this case, the shield layer may incorporate: a first layer disposed adjacent to the gap layer; and a second layer disposed on a side of the first layer opposite to the gap layer, and the first layer may have a portion located above the nonmagnetic film.

The first method of the invention may further comprise the step of forming a yoke layer touching the surface of the second portion farther from the substrate. In this case, an end of the yoke layer closer to the medium facing surface may be located farther from the medium facing surface than the boundary between the front end face of the second portion and the surface of the second portion farther from the substrate.

In the first method of the invention, the gap layer may be formed by chemical vapor deposition in which formation of a single atomic layer is repeated.

A magnetic head for perpendicular magnetic recording manufactured by a second method of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; an encasing layer that is made of a nonmagnetic material, has a groove that opens in the top surface of the encasing layer, and accommodates a portion of the pole layer; and a substrate on which the encasing layer, the pole layer and the coil are stacked.

The pole layer incorporates: a first portion having the end face located in the medium facing surface; and a second portion that is located farther from the medium facing surface than the first portion and has a thickness greater than that of the first portion. A surface of the first portion farther from the substrate is located closer to the substrate than a surface of the second portion farther from the substrate. The end face of the pole layer located in the medium facing surface has a first side close to the substrate and a second side located opposite to the first side, the second side defining the track width.

The second method of manufacturing the magnetic head of the invention comprises the steps of forming the encasing layer; forming a polishing stopper layer around the groove in a region higher than the top surface of the encasing layer, the polishing stopper layer indicating a level at which polishing of the step of polishing to be performed later is stopped; forming a magnetic layer that will be formed into the pole layer by polishing and etching later, such that the groove of the encasing layer is filled with the magnetic layer and that the top surface of the magnetic layer is located higher than the top surface of the polishing stopper layer; polishing the top surface of the magnetic layer until a portion of the magnetic layer located higher than the top surface of the polishing stopper layer is removed; etching a portion of the magnetic layer such that the first and second portions are formed and the magnetic layer is thereby formed into the pole layer; and forming the coil.

In the second method of the invention, the step of forming the encasing layer may include the steps of forming a nonmagnetic layer that will be formed into the encasing layer by forming the groove therein later; forming a nonmagnetic metal layer made of a nonmagnetic metal material on the top surface of the nonmagnetic layer, the nonmagnetic metal layer having a penetrating opening with a shape corresponding to the plane geometry of the pole layer; and forming the groove in the nonmagnetic layer by selectively etching a portion of the nonmagnetic layer exposed from the opening of the nonmagnetic metal layer, so that the nonmagnetic layer is formed into the encasing layer. In the step of forming the polishing stopper layer, the polishing stopper layer may be formed in a region higher than the top surface of the nonmagnetic metal layer. In the step of forming the magnetic layer, the magnetic layer may be formed such that the groove of the encasing layer and the opening of the nonmagnetic metal layer are filled with the magnetic layer and that the top surface of the magnetic layer is located higher than the top surface of the polishing stopper layer. In the step of etching the portion of the magnetic layer, etching may be performed such that the second side is located at a height that falls within a range between a height at which the top surface of the nonmagnetic metal layer as initially formed is located and a height at which a bottom surface thereof is located.

In the second method of the invention, the end face of the pole layer located in the medium facing surface may have a first region and a second region connected to the first region and located farther from the substrate than the first region. In addition, the first region may have a width that decreases as the distance from the substrate decreases, and the second region may have a uniform width that defines the track width.

In the second method of the invention, chemical mechanical polishing may be employed in the step of polishing. Ion beam etching may be employed in the step of etching.

A magnetic head for perpendicular magnetic recording manufactured by a third method of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; an encasing layer that is made of a nonmagnetic material, has a groove that opens in the top surface of the encasing layer, and accommodates a portion of the pole layer; and a substrate on which the encasing layer, the pole layer and the coil are stacked.

The pole layer incorporates: a first portion having a lower layer and an upper layer that are stacked and having the end face located in the medium facing surface; and a second portion that is located farther from the medium facing surface than the first portion and has a thickness greater than that of the first portion. A surface of the first portion farther from the substrate is located closer to the substrate than a surface of the second portion farther from the substrate. The end face of the pole layer located in the medium facing surface has a first side close to the substrate and a second side located opposite to the first side, the second side defining the track width.

The third method of the invention comprises the steps of forming the encasing layer; forming a polishing stopper layer around the groove in a region higher than the top surface of the encasing layer, the polishing stopper layer indicating a level at which polishing of the step of polishing to be performed later is stopped; forming a magnetic layer for the lower layer that will be formed into the lower layer by polishing and etching later, such that the groove of the encasing layer is filled with the magnetic layer for the lower layer and that a top surface of the magnetic layer is located higher than the top surface of the polishing stopper layer; polishing the top surface of the magnetic layer for the lower layer until a portion of the magnetic layer for the lower layer located higher than the top surface of the polishing stopper layer is removed; forming a magnetic layer for the upper layer that will be the upper layer later on the magnetic layer for the lower layer polished; etching a portion of the magnetic layer for the lower layer by using the magnetic layer for the upper layer as a mask, so that the magnetic layer for the lower layer is formed into the lower layer and that the magnetic layer for the upper layer is formed into the upper layer; and forming the coil.

In the third method of the invention, the step of forming the encasing layer may include the steps of: forming a nonmagnetic layer that will be formed into the encasing layer by forming the groove therein later; forming a nonmagnetic metal layer made of a nonmagnetic metal material on the top surface of the nonmagnetic layer, the nonmagnetic metal layer having a penetrating opening with a shape corresponding to the plane geometry of the pole layer; and forming the groove in the nonmagnetic layer by selectively etching a portion of the nonmagnetic layer exposed from the opening of the nonmagnetic metal layer, so that the nonmagnetic layer is formed into the encasing layer. In the step of forming the polishing stopper layer, the polishing stopper layer may be formed in a region higher than the top surface of the nonmagnetic metal layer. In the step of forming the magnetic layer for the lower layer, the magnetic layer for the lower layer may be formed such that the groove of the encasing layer and the opening of the nonmagnetic metal layer are filled with the magnetic layer for the lower layer and that the top surface of the magnetic layer for the lower layer is located higher than the top surface of the polishing stopper layer. In the step of etching the portion of the magnetic layer for the lower layer, etching may be performed such that the second side is located at a height that falls within a range between a height at which the top surface of the nonmagnetic metal layer as initially formed is located and a height at which the bottom surface thereof is located.

According to the third method of the invention, the end face of the pole layer located in the medium facing surface may have a first region and a second region connected to the first region and located farther from the substrate than the first region. In addition, the first region may have a width that decreases as the distance from the substrate decreases, and the second region may have a uniform width that defines the track width.

In the third method of the invention, chemical mechanical polishing may be employed in the step of polishing, and the magnetic layer for the upper layer may be formed by frame plating. Ion beam etching may be employed in the step of etching.

According to the magnetic head for perpendicular magnetic recording of the invention or the first to third methods of manufacturing the magnetic head for perpendicular magnetic recording of the invention, the pole layer has the first and second portions. As a result, it is possible to control the thickness of the pole layer taken in the medium facing surface with precision and to introduce a magnetic flux of great magnitude to the medium facing surface through the pole layer.

According to the magnetic head or the first method of the invention, the shield layer has the portion located between the front end face of the second portion and the medium facing surface in the region closer to the substrate than the surface of the second portion farther from the substrate. As a result, it is possible to prevent magnetic flux leaking halfway through the pole layer from further leaking to the outside from the medium facing surface.

Other and further objects, features and advantages of the invention will appear more fully from the following description.

BRIEF DESCRIPTION OF THE DRAWINGS

FIG. 7A and FIG. 7B are views for illustrating a step that follows the step shown in FIG. 6A and FIG. 6B.

FIG. 8A and FIG. 8B are views for illustrating a step that follows the step shown in FIG. 7A and FIG. 7B.

FIG. 14A and FIG. 14B are views for illustrating a third modification example of the magnetic head of the first embodiment of the invention.

FIG. 15A and FIG. 15B are views for illustrating a fourth modification example of the magnetic head of the first embodiment of the invention.

FIG. 16A and FIG. 16B are views for illustrating a fifth modification example of the magnetic head of the first embodiment of the invention.

FIG. 17A and FIG. 17B are views for illustrating a sixth modification example of the magnetic head of the first embodiment of the invention.

FIG. 22A and FIG. 22B are views for illustrating a step that follows the step shown in FIG. 21A and FIG. 21B.

FIG. 23A and FIG. 23B are views for illustrating a first modification example of the magnetic head of the second embodiment of the invention.

FIG. 24A and FIG. 24B are views for illustrating a second modification example of the magnetic head of the second embodiment of the invention.

FIG. 25A and FIG. 25B are views for illustrating a step of a method of manufacturing a magnetic head of a third embodiment of the invention.

FIG. 26A and FIG. 26B are views for illustrating a step that follows the step shown in FIG. 25A and FIG. 25B.

FIG. 27A and FIG. 27B are views for illustrating a step that follows the step shown in FIG. 26A and FIG. 26B.

DETAILED DESCRIPTION OF THE PREFERRED EMBODIMENTS

First Embodiment

Figure 2:
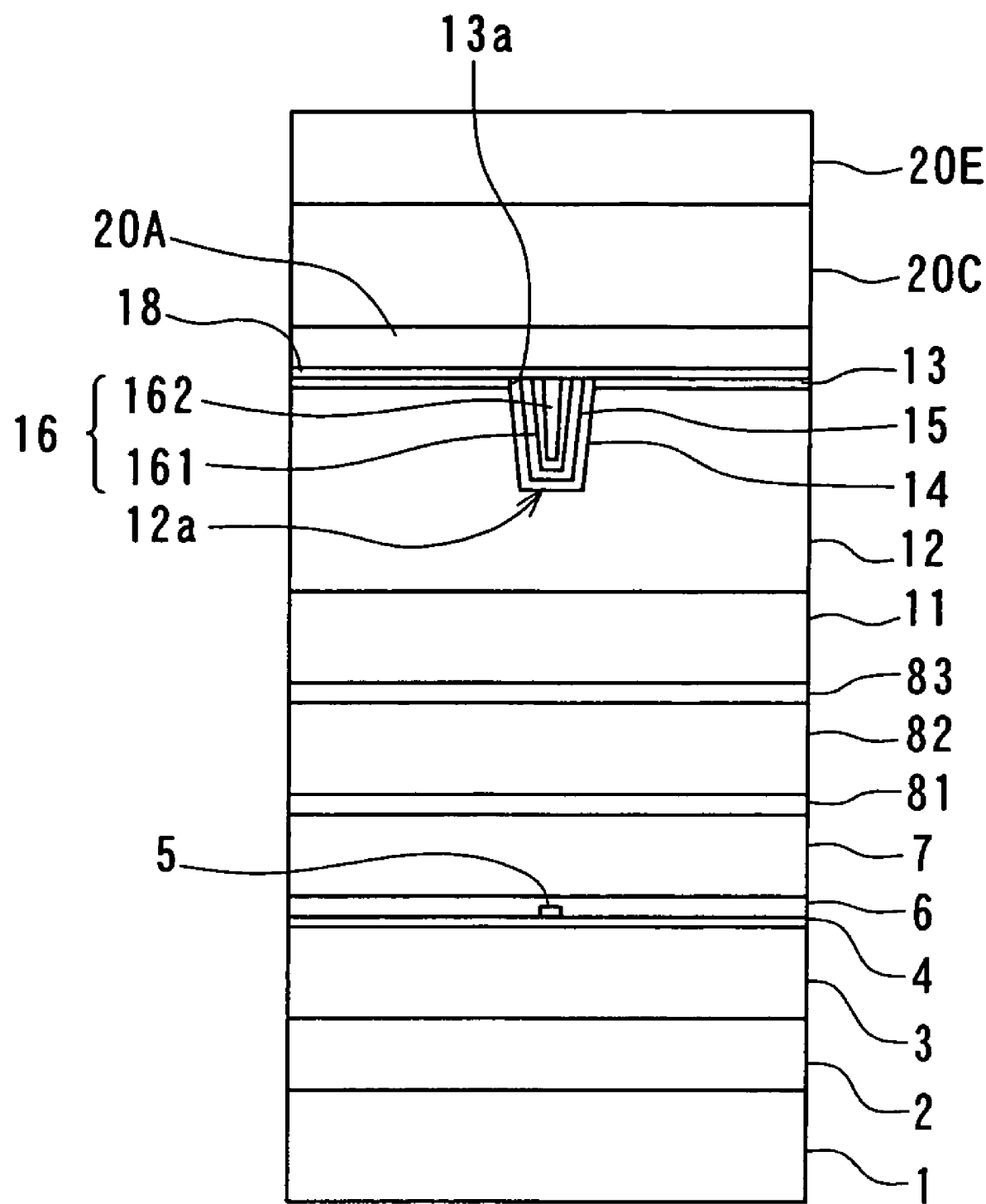
FIG. 2 is a front view of the medium facing surface of the magnetic head of the first embodiment of the invention.
Figure 3:
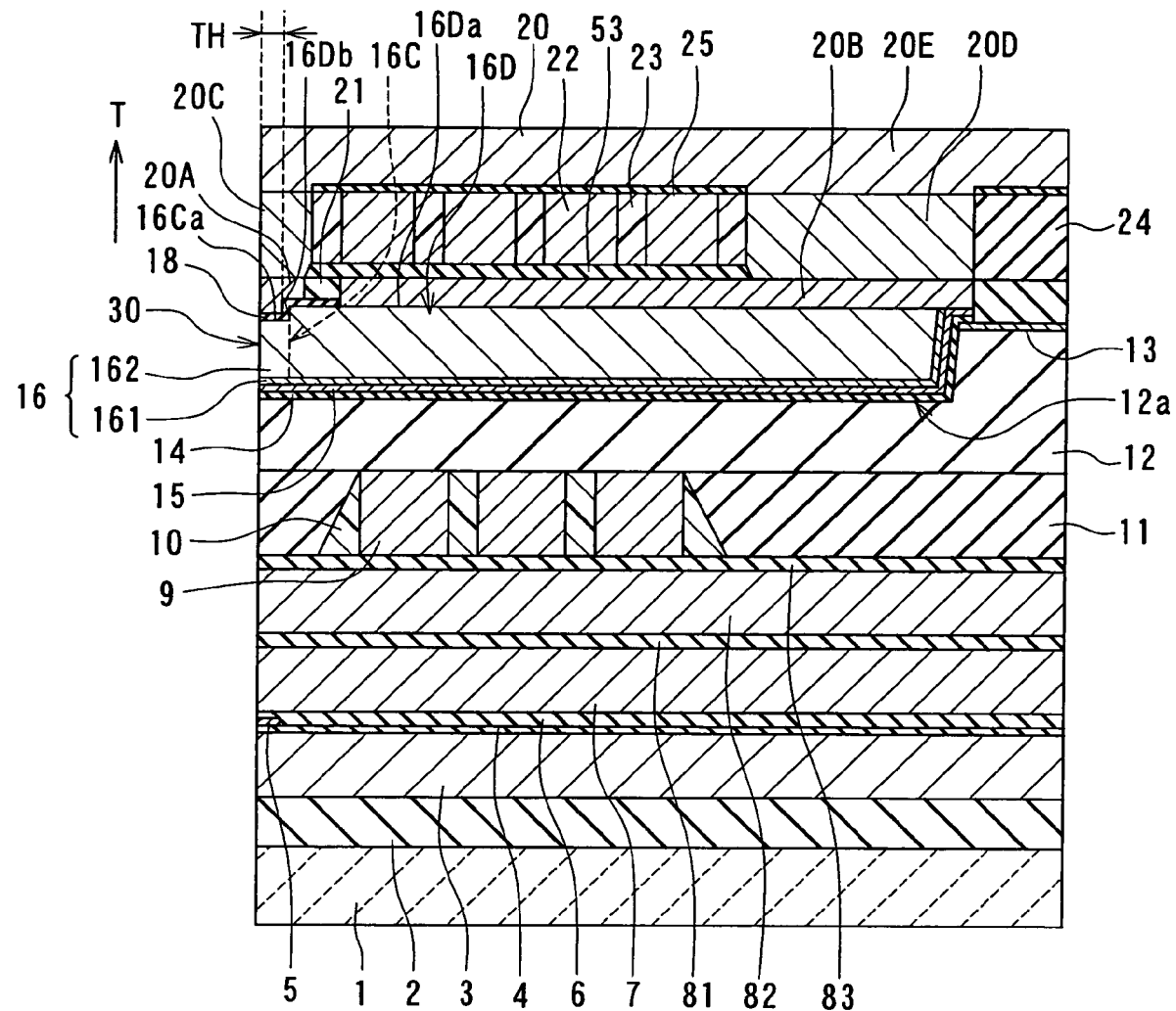
FIG. 3 is a cross-sectional view for illustrating the configuration of the magnetic head of the first embodiment of the invention.

Preferred embodiments of the invention will now be described in detail with reference to the accompanying drawings. Reference is now made to FIG. 2 and FIG. 3 to describe the configuration of a magnetic head for perpendicular magnetic recording of a first embodiment of the invention. FIG. 2 is a front view for illustrating the medium facing surface of the magnetic head of the embodiment. FIG. 3 is a cross-sectional view for illustrating the configuration of the magnetic head of the embodiment. FIG. 3 illustrates a cross section orthogonal to the medium facing surface and a surface of a substrate. The arrow indicated with T in FIG. 3 shows the direction of travel of a recording medium.

As shown in FIG. 2 and FIG. 3, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises a nonmagnetic layer 81 and a second top shield layer 82 that are disposed on the first top shield layer 7 one by one. The nonmagnetic layer 81 is made of a nonmagnetic material such as alumina. The second top shield layer 82 is made of a magnetic material. The portions from the bottom shield layer 3 to the second top shield layer 82 make up the read head.

The magnetic head further comprises: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further comprises an encasing layer 12 made of a nonmagnetic material and disposed on the flattened top surfaces of the coil 9 and the insulating layers 10 and 11. The encasing layer 12 has a groove 12a that opens in the top surface thereof and that accommodates a pole layer described later. The encasing layer 12 may be made of an insulating material such as alumina, silicon oxide ($SiO_x$), or silicon oxynitride (SiON), or a nonmagnetic metal material such as Ru, Ta, Mo, Ti, W, NiCu, NiB or NiPd.

The magnetic head further comprises a nonmagnetic metal layer 13 made of a nonmagnetic metal material and disposed on the top surface of the encasing layer 12. The nonmagnetic metal layer 13 has an opening 13a that penetrates, and the edge of the opening 13a is located directly above the edge of the groove 12a in the top surface of the encasing layer 12. The nonmagnetic metal layer 13 may be made of any of Ta, Mo, W, Ti, Ru, Rh, Re, Pt, Pd, Ir, NiCr, NiP, NiPd, NiB, $WSi_2$, $TaSi_2$, $TiSi_2$, TiN, and TiW, for example.

The magnetic head further comprises a nonmagnetic film 14, a polishing stopper layer 15 and the pole layer 16 that are disposed in the groove 12a of the encasing layer 12 and in the opening 13a of the nonmagnetic metal layer 13. The nonmagnetic film 14 is disposed to touch the surface of the groove 12a. The pole layer 16 is disposed apart from the surface of the groove 12a. The polishing stopper layer 15 is disposed between the nonmagnetic film 14 and the pole layer 16. The polishing stopper layer 15 also functions as a seed layer used for forming the pole layer 16 by plating. The pole layer 16 incorporates: a first layer 161 located closer to the surface of the groove 12a; and a second layer 162 located farther from the surface of the groove 12a. The first layer 161 may be omitted, however.

The nonmagnetic film 14 may be made of an insulating material or a semiconductor material, for example. The insulating material as the material of the nonmagnetic film 14 may be any of alumina, silicon oxide ($SiO_x$), and silicon oxynitride (SiON). The semiconductor material as the material of the nonmagnetic film 14 may be polycrystalline silicon or amorphous silicon.

The polishing stopper layer 15 is made of a nonmagnetic conductive material. The material of the polishing stopper layer 15 may be the same as that of the nonmagnetic metal layer 13.

Each of the first layer 161 and the second layer 162 is made of a magnetic metal material. The first layer 161 may be made of any of CoFeN, CoNiFe, NiFe, and CoFe, for example. The second layer 162 may be made of any of NiFe, CoNiFe and CoFe, for example.

The magnetic head further comprises a gap layer 18 disposed on the top surfaces of the nonmagnetic metal layer 13, the nonmagnetic film 14, the polishing stopper layer 15 and the pole layer 16. The gap layer 18 has an opening located at a distance from the medium facing surface 30. The gap layer 18 may be made of an insulating material such as alumina or a nonmagnetic metal material such as Ru, NiCu, Ta, W, NiB or NiPd.

The magnetic head further comprises a shield layer 20. The shield layer 20 has: a first layer 20A disposed on the gap layer 18; a second layer 20C disposed on the first layer 20A; a yoke layer 20B disposed on a portion of the pole layer 16 where the opening of the gap layer 18 is formed; a coupling layer 20D disposed on the yoke layer 20B; and a third layer 20E disposed to couple the second layer 20C to the coupling layer 20D. The first layer 20A, the yoke layer 20B, the second layer 20C, the coupling layer 20D and the third layer 20E are each made of a magnetic material. These layers 20A to 20E may be made of any of CoFeN, CoNiFe, NiFe and CoFe, for example.

The magnetic head further comprises a nonmagnetic layer 21 made of a nonmagnetic material and disposed around the yoke layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, or Cu.

The magnetic head further comprises: an insulating layer 53 disposed on regions of the top surfaces of the yoke layer 20B and the nonmagnetic layer 21 in which a coil 22 described later is disposed; the coil 22 disposed on the insulating layer 53; an insulating layer 23 disposed around the coil 22 and in the space between the respective adjacent turns of the coil 22; an insulating layer 24 disposed around the insulating layer 23; and an insulating layer 25 disposed on the coil 22 and the insulating layers 23 and 24. The coil 22 is flat-whorl-shaped. A portion of the coil 22 passes between the second layer 20C and the coupling layer 20D. The coil 22 is made of a conductive material such as copper. The second layer 20C, the coupling layer 20D, and the insulating layers 23 and 24 have flattened top surfaces. The insulating layer 23 is made of photoresist, for example. The insulating layers 53, 24 and 25 are made of alumina, for example.

The portions from the coil 9 to the third layer 20E of the shield layer 20 make up the write head. Although not shown, the magnetic head further comprises a protection layer for covering the shield layer 20.

As described so far, the magnetic head of the embodiment comprises the medium facing surface 30 that faces toward a recording medium, the read head, and the write head. The read head and the write head are stacked on the substrate 1. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the encasing layer 12, the nonmagnetic metal layer 13, the nonmagnetic film 14, the polishing stopper layer 15, the pole layer 16, the gap layer 18, the shield layer 20, and the coil 22. The coils 9 and 22 generate a magnetic field corresponding to data to be written on the recording medium. The coil 9 is not a component requisite for the write head and may be omitted. The nonmagnetic film 14 may be omitted.

The pole layer 16 has an end face located in the medium facing surface 30. The pole layer 16 allows the magnetic flux corresponding to the field generated by the coil 22 to pass therethrough and generates a write magnetic field for writing the data on the medium by using the perpendicular magnetic recording system.

The shield layer 20 has an end face located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end face of the shield layer 20 is disposed forward of the end face of the pole layer 16 along the direction T of travel of the recording medium with a specific space created by the thickness of the gap layer 18. The thickness of the gap layer 18 falls within a range of 30 to 60 nm inclusive, for example. At least part of the coil 22 is disposed between the pole layer 16 and the shield layer 20 and insulated from the pole layer 16 and the shield layer 20.

The pole layer 16 is disposed in the groove 12a of the encasing layer 12 and in the opening 13a of the nonmagnetic metal layer 13 with the nonmagnetic film 14 and the polishing stopper layer 15 disposed between the pole layer 16 and each of the groove 12a and the opening 13a. The nonmagnetic film 14 has a thickness that falls within a range of 10 to 40 nm inclusive, for example. However, the thickness of the nonmagnetic film 14 is not limited to this range but may be of any other value, depending on the track width. The polishing stopper layer 15 has a thickness that falls within a range of 30 to 100 nm inclusive, for example.

The pole layer 16 incorporates: the first layer 161 located closer to the surface of the groove 12a; and the second layer 162 located farther from the surface of the groove 12a. The first layer 161 has a thickness that falls within a range of 0 to 100 nm inclusive, for example. The first layer 161 having a thickness of 0 nm means that the first layer 161 is not provided.

The shield layer 20 has: the first layer 20A disposed adjacent to the gap layer 18; the second layer 20C disposed on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The second layer 20C is disposed between the medium facing surface 30 and the at least part of the coil 22.

The first layer 20A has: a first end located in the medium facing surface 30; and a second end opposite to the first end. The second layer 20C also has: a first end located in the medium facing surface 30; and a second end opposite to the first end. Throat height TH is the distance between the medium facing surface 30 and one of two points that is closer to the medium facing surface 30, wherein one of the two points is the one at which the space between the pole layer 16 and the shield layer 20 starts to increase when seen from the medium facing surface 30, and the other of the points is the one at which the gap layer 18 first bends when seen from the medium facing surface 30. In the embodiment, as will be described in detail later, the throat height TH is the distance between the medium facing surface 30 and the point at which the gap layer 18 first bends when seen from the medium facing surface 30. The throat height TH falls within a range of 0.05 to 0.3 μm inclusive, for example. The minimum distance between the first end and the second end of the portion of the second layer 20C facing toward the pole layer 16 with the gap layer 18 and the first layer 20A disposed in between falls within a range of 0.3 to 0.8 μm inclusive, for example. The first layer 20A and the yoke layer 28B have a thickness that falls within a range of 0.3 to 0.8 μm inclusive, for example. The second layer 20C and the coupling layer 20D have a thickness that falls within a range of 1.5 to 3.0 μm inclusive, for example. The third layer 20E has a thickness that falls within a range of 2.0 to 3.0 μm inclusive, for example. The coil 22 has a thickness that is equal to or smaller than the thickness of the second layer 20C and that falls within a range of 1.5 to 3.0 μm inclusive, for example.

Figure 1:
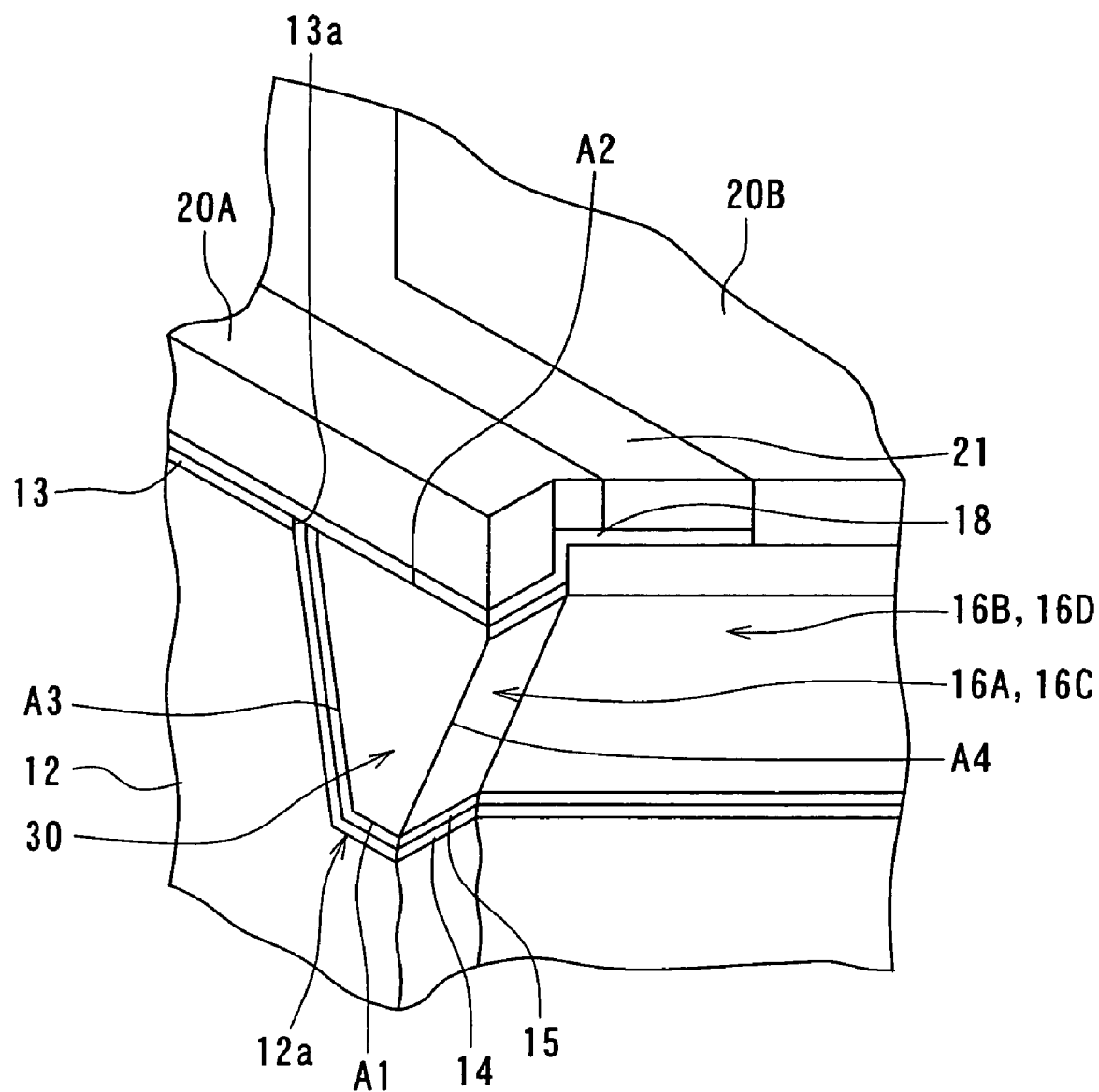
FIG. 1 is a perspective view illustrating a portion of a pole layer of a magnetic head of a first embodiment of the invention in a neighborhood of the medium facing surface.
Figure 4:
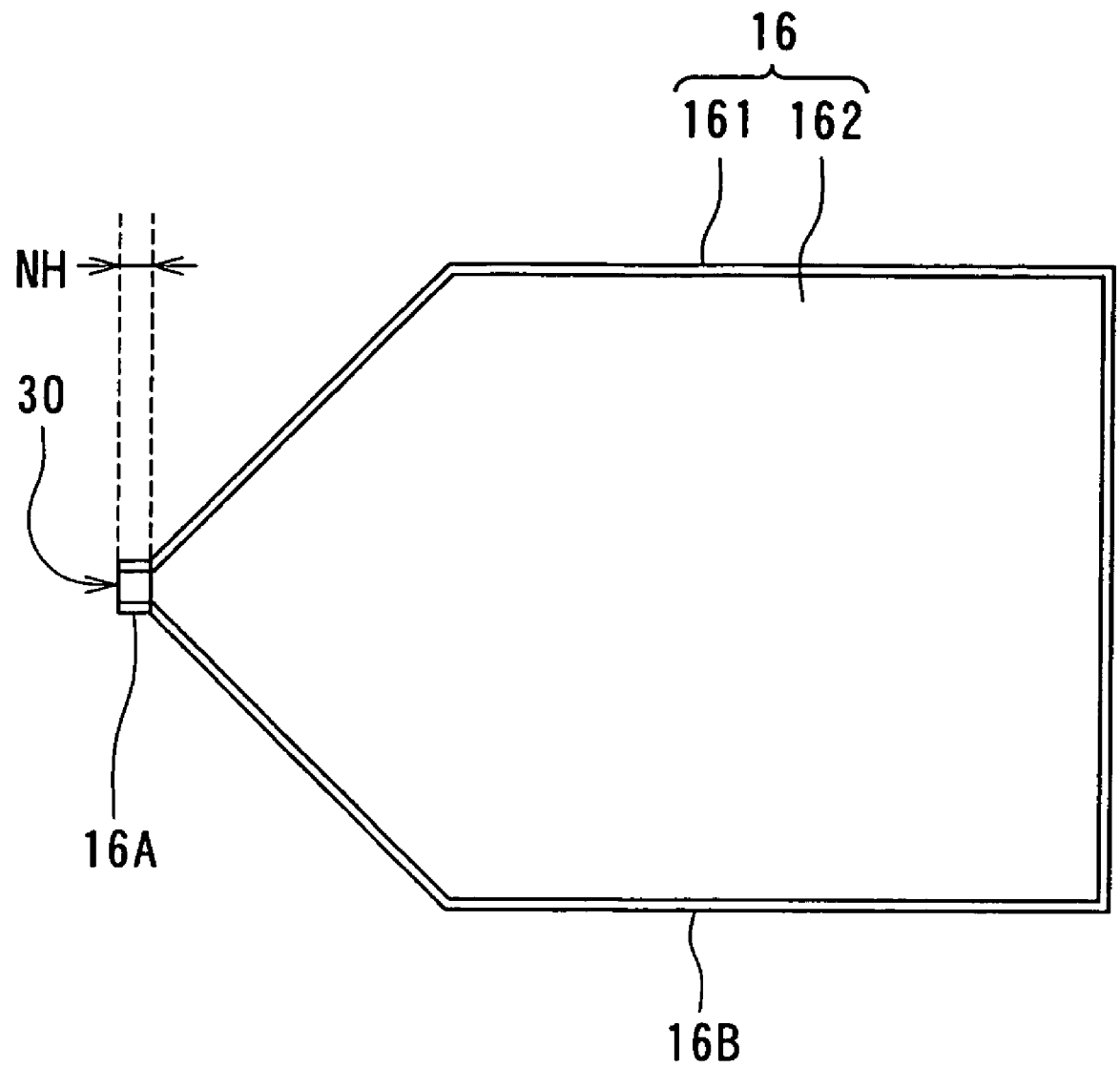
FIG. 4 is a top view of the pole layer of the magnetic head of the first embodiment of the invention.

Reference is now made to FIG. 1 and FIG. 4 to describe the shape of the pole layer 16 in detail. FIG. 1 is a perspective view of a portion of the pole layer 16 near the medium facing surface 30. FIG. 4 is a top view of the pole layer 16. As shown in FIG. 1 and FIG. 4, the pole layer 16 incorporates a track width defining portion 16A and a wide portion 16B. The track width defining portion 16A has an end face located in the medium facing surface 30. The wide portion 16B is located farther from the medium facing surface 30 than the track width defining portion 16A and has a width greater than the width of the track width defining portion 16A. The width of the track width defining portion 16A does not change in accordance with the distance from the medium facing surface 30. The wide portion 16B is equal in width to the track width defining portion 16A at the interface with the track width defining portion 16A, and gradually increases in width as the distance from the medium facing surface 30 increases and then maintains a specific width to the end of the wide portion 16B. In the embodiment, the track width defining portion 16A is a portion of the pole layer 16 from the end face located in the medium facing surface 30 to the point at which the width of the pole layer 16 starts to increase. Here, the length of the track width defining portion 16A taken in the direction orthogonal to the medium facing surface 30 is called a neck height NH. The neck height NH falls within a range of 0.1 to 0.3 μm inclusive, for example.

The pole layer 16 incorporates: a first portion 16C having the end face located in the medium facing surface 30; and a second portion 16D located farther from the medium facing surface 30 than the first portion 16C and having a thickness greater than that of the first portion 16C. The thickness of the first portion 16C does not change in accordance with the distance from the medium facing surface 30.

FIG. 1 illustrates an example in which the location of the boundary between the first portion 16C and the second portion 16D coincides with the location of the boundary between the track width defining portion 16A and the wide portion 16B. In this case, the first portion 16C coincides with the track width defining portion 16A, and the second portion 16D coincides with the wide portion 16B. However, the boundary between the first portion 16C and the second portion 16D may be located closer to or farther from the medium facing surface 30 than the boundary between the track width defining portion 16A and the wide portion 16B. The distance from the medium facing surface 30 to the boundary between the first portion 16C and the second portion 16D falls within a range of 0.1 to 0.5 μm inclusive, for example. The example in which the location of the boundary between the first portion 16C and the second portion 16D coincides with the location of the boundary between the track width defining portion 16A and the wide portion 16B will now be described.

A surface (a top surface) 16Ca of the first portion 16C farther from the substrate 1 is located closer to the substrate 1 than a surface (a top surface) 16Da of the second portion 16D farther from the substrate 1. The second portion 16D has a front end face 16Db that couples the surface 16Ca of the first portion 16C farther from the substrate 1 to the surface 16Da of the second portion 16D farther from the substrate 1. The front end face 16Db may be nearly orthogonal to the top surface of the substrate 1. Here, the front end face 16Db nearly orthogonal to the top surface of the substrate 1 means that the front end face 16Db forms an angle that falls within a range of 80 to 90 degrees inclusive with respect to the top surface of the substrate 1. If the front end face 16Db forms an angle that is equal to or greater than 80 degrees and smaller than 90 degrees with respect to the top surface of the substrate 1, each of the angle formed between the surfaces 16Ca and 16Db and the angle formed between the surfaces 16Da and 16Db is an obtuse angle. Alternatively, the front end face 16Db may be tilted with respect to the direction orthogonal to the top surface of the substrate 1 such that, in the region in which the front end face 16Db is located, the thickness of the pole layer 16 gradually increases as the distance from the medium facing surface 30 increases. In this case, the front end face 16Db preferably forms an angle that is equal to or greater than 30 degrees and smaller than 80 degrees with respect to the top surface of the substrate 1. FIG. 1 illustrates an example in which the front end face 16Db is nearly orthogonal to the top surface of the substrate 1. The difference in level created between the surface 16Ca and the surface 16Da falls within a range of 0.1 to 0.3 μm inclusive, for example.

The shield layer 20 has a portion that is sandwiched between the front end face 16Db and the medium facing surface 30 and that is located in a region closer to the substrate 1 than the surface 16Da of the second portion 16D farther from the substrate 1. To be specific, this portion is a portion of the first layer 20A closer to the substrate 1 than the surface 16Da.

FIG. 1 and FIG. 3 illustrate an example in which the first layer 20A is located not only in a region above the first portion 16C of the pole layer 16 but also in a region above a portion of the second portion 16D. However, as will be shown as a modification example later, the first layer 20A may be located only in the region above the first portion 16C of the pole layer 16. In the example illustrated in FIG. 1 and FIG. 3, the top surface of the pole layer 16 bends in the position of the boundary between the surfaces 16Ca and 16Db and in the position of the boundary between the surfaces 16Db and 16Da. The bottom surface of the first layer 20A bends to correspond to the shape of the top surface of the pole layer 16 so as to face toward the surfaces 16Ca, 16Db and 16Da of the pole layer 16, the gap layer 18 being disposed between the bottom surface of the first layer 20A and the surfaces 16Ca, 16Db and 16Da. The gap layer 18 disposed between the top surface of the pole layer 16 and the bottom surface of the first layer 20A also bends to correspond to the shape of the top surface of the pole layer 16. In the embodiment, the throat height TH is the distance between the medium facing surface 30 and the point at which the gap layer 18 first bends when seen from the medium facing surface 30, that is, the distance between the medium facing surface 30 and the point at which the bottom surface of the first layer 20A first bends when seen from the medium facing surface 30. The reason will now be described. In the region from the medium facing surface 30 to the point at which the gap layer 18 first bends when seen from the medium facing surface 30, the flux leakage between the pole layer 16 and the shield layer 20 is greater, compared with the flux leakage between the pole layer 16 and the shield layer 20 in any other region. Furthermore, it is the flux leakage between the pole layer 16 and the shield layer 20 in the region from the medium facing surface 30 to the point at which the gap layer 18 first bends when seen from the medium facing surface 30 that contributes to writing of data. Therefore, it is appropriate that the throat height TH is defined as the distance from the medium facing surface 30 to the point at which the gap layer 18 first bends when seen from the medium facing surface 30.

An end of the yoke layer 20B of the shield layer 20 closer to the medium facing surface 30 is located farther from the medium facing surface 30 than the boundary between the surfaces 16Da and 16Db of the pole layer 16.

The end face of the pole layer 16 located in the medium facing surface 30 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the pole layer 16 located in the medium facing surface 30 decreases as the distance from the first side A1 decreases. Each of the third side A3 and the fourth side A4 forms an angle that falls within a range of 5 to 15 degrees inclusive, for example, with respect to the direction orthogonal to the top surface of the substrate 1.

The length of the second side A2, that is, the track width, falls within a range of 0.05 to 0.20 µm inclusive, for example. The thickness of the second portion 16D falls within a range of 0.3 to 0.5 µm inclusive, for example. The thickness of the first portion 16C falls within a range of 0.05 to 0.3 µm inclusive, for example.

The gap layer 18 touches the surface 16Ca of the first portion 16C farther from the substrate 1, the front end face 16Db, and the surface 16Da of the second portion 16D farther from the substrate 1.

Figures 5A, 5B:
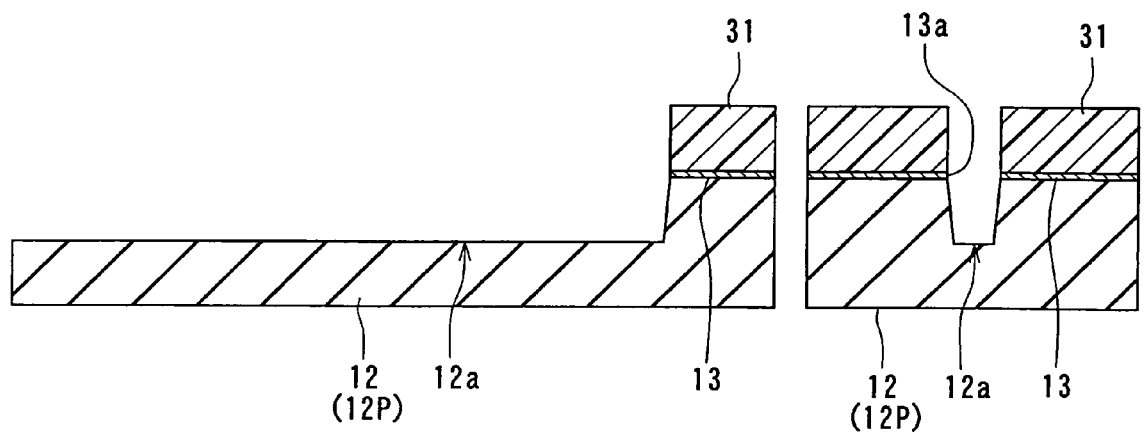
FIG. 5A and FIG. 5B are views for illustrating a step of a method of manufacturing the magnetic head of the first embodiment of the invention.

Reference is now made to FIG. 5A to FIG. 11A and FIG. 5B to FIG. 11B to describe a method of manufacturing the magnetic head of the embodiment. FIG. 5A to FIG. 1A are cross-sectional views of layered structures obtained in manufacturing process of the magnetic head orthogonal to the medium facing surface and the substrate. FIG. 5B to FIG. 11B show cross sections of portions of the layered structures near the medium facing surface, the cross sections being parallel to the medium facing surface. The portions closer to the substrate 1 than the encasing layer 12 are omitted in FIG. 5A to FIG. 11A and FIG. 5B to FIG. 11B.

According to the method of manufacturing the magnetic head of the embodiment, as shown in FIG. 3, the insulating layer 2, the bottom shield layer 3 and the bottom shield gap film 4 are first formed one by one on the substrate 1. Next, the MR element 5 and leads (not shown) connected to the MR element 5 are formed on the bottom shield gap film 4. Next, the top shield gap film 6 is formed to cover the MR element 5 and the leads. Next, the top shield layer 7, the nonmagnetic layer 81, the second top shield layer 82, and the insulating layer 83 are formed one by one on the top shield gap film 6. Next, the coil 9 and the insulating layers 10 and 11 are formed on the insulating layer 83. Next, the top surfaces of the coil 9 and the insulating layers 10 and 11 are flattened by CMP, for example.

FIG. 5A and FIG. 5B illustrate the following step. In the step, first, a nonmagnetic layer 12P is formed on the flattened top surfaces of the coil 9 and the insulating layers 10 and 11. The groove 12a will be formed in the nonmagnetic layer 12P and the nonmagnetic layer 12P will be thereby formed into the encasing layer 12 later. Next, the nonmagnetic metal layer 13 made of a nonmagnetic metal material is formed by sputtering, for example, on the nonmagnetic layer 12P. The nonmagnetic metal layer 13 has a thickness that falls within a range of 20 to 100 nm inclusive, for example.

Next, a photoresist layer having a thickness of 1.0 µm, for example, is formed on the nonmagnetic metal layer 13. The photoresist layer is then patterned to form a mask 31 for making the groove 12a of the encasing layer 12. The mask 31 has an opening having a shape corresponding to the groove 12a.

Next, the nonmagnetic metal layer 13 is selectively etched by using the mask 31. The opening 13a that penetrates is thereby formed in the nonmagnetic metal layer 13. The opening 13a has a shape corresponding to the plane geometry of the pole layer 16 to be formed later. Furthermore, a portion of the nonmagnetic layer 12P exposed from the opening 13a of the nonmagnetic metal layer 13 is selectively etched so as to form the groove 12a in the nonmagnetic layer 12P. The mask 31 is then removed. The nonmagnetic layer 12P is formed into the encasing layer 12 by forming the groove 12a therein. The nonmagnetic metal layer 13 will be the reference that indicates the level at which etching to be performed later for forming the surfaces 16Ca, 16Da and 16Db of the pole layer 16 is stopped. The edge of the opening 13a of the nonmagnetic metal layer 13 is located directly above the edge of the groove 12a located in the top surface of the encasing layer 12.

The etching of each of the nonmagnetic metal layer 13 and the nonmagnetic layer 12P is performed by reactive ion etching or ion beam etching, for example. The etching for forming the groove 12a in the nonmagnetic layer 12P is performed such that the walls of the groove 12a corresponding to both sides of the track width defining portion 16A of the pole layer 16 each form an angle that falls within a range of 5 to 15 degrees inclusive, for example, with respect to the direction orthogonal to the top surface of the substrate 1.

Figures 6A, 6B:
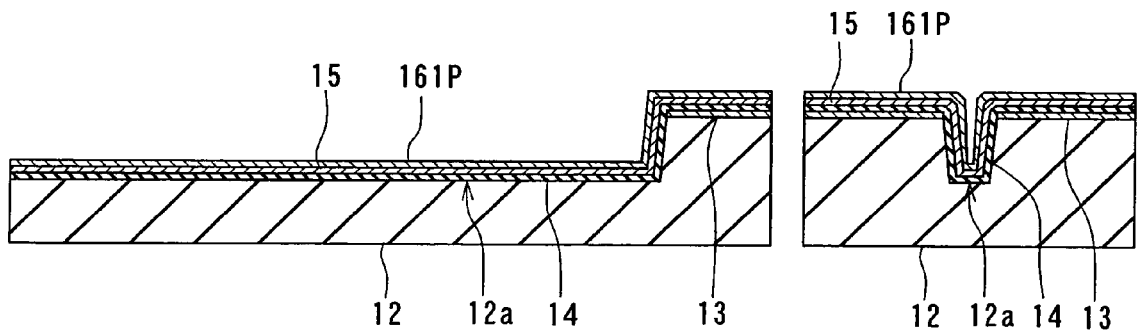
FIG. 6A and FIG. 6B are views for illustrating a step that follows the step shown in FIG. 5A and FIG. 5B.

FIG. 6A and FIG. 6B illustrate the following step. In the step, first, the nonmagnetic film 14 is formed on the entire top surface of the layered structure. The nonmagnetic film 14 is formed in the groove 12a of the encasing layer 12, too. The nonmagnetic film 14 is formed by sputtering or chemical vapor deposition (hereinafter referred to as CVD), for example. It is possible to control the thickness of the nonmagnetic film 14 with precision. If the nonmagnetic film 14 is formed by CVD, it is preferred to employ a method called 'atomic layer CVD' (ALCVD) in which formation of a single atomic layer is repeated. In this case, it is possible to control the thickness of the nonmagnetic film 14 with higher precision. When ALCVD is employed to form the nonmagnetic film 14, it is preferable to use alumina, in particular, as the material of the nonmagnetic film 14. If the nonmagnetic film 14 is made of a semiconductor material, it is preferred to form the nonmagnetic film 14 by ALCVD at a low temperature (around 200° C.) or by low-pressure CVD at a low temperature. The semiconductor material as the material of the nonmagnetic film 14 is preferably undoped polycrystalline silicon or amorphous silicon.

Next, the polishing stopper layer 15 is formed on the entire top surface of the layered structure by sputtering or ALCVD, for example. The polishing stopper layer 15 is formed in the groove 12a of the encasing layer 12, too. The polishing stopper layer 15 indicates the level at which polishing of the polishing step to be performed later is stopped.

Next, a first magnetic layer 161P to be the first layer 161 of the pole layer 16 is formed on the entire top surface of the layered structure. The first magnetic layer 161P is formed by sputtering or ion beam deposition (hereinafter referred to as IBD), for example. If the first magnetic layer 161P is formed by sputtering, it is preferred to employ collimation sputtering or long throw sputtering. Since the first layer 161 may be omitted as previously described, it is not absolutely necessary to form the first magnetic layer 161P.

FIG. 7A and FIG. 7B illustrate the following step. In the step, first, a second magnetic layer 162P to be the second layer 162 of the pole layer 16 is formed on the first magnetic layer 161P. The second magnetic layer 162P is formed such that the top surface thereof is located higher than the top surfaces of the nonmagnetic metal layer 13, the nonmagnetic film 14 and the polishing stopper layer 15. The second magnetic layer 162P is formed by frame plating, for example. In this case, the first magnetic layer 161P is used as an electrode for plating. If the polishing stopper layer 15 is made of a conductive material, the layer 15 is used as an electrode for plating, too. The second magnetic layer 162P may be formed by making an unpatterned plating layer and then patterning the plating layer through etching.

Next, a coating layer not shown made of alumina, for example, and having a thickness of 0.5 to 1.2 µm, for example, is formed on the entire top surface of the layered structure. Next, the coating layer, the second magnetic layer 162P and the first magnetic layer 161P are polished by CMP, for example, so that the polishing stopper layer 15 is exposed, and the top surfaces of the polishing stopper layer 15, the first magnetic layer 161P and the second magnetic layer 162P are thereby flattened. If the coating layer, the second magnetic layer 162P and the first magnetic layer 161P are polished by CMP, such a slurry is used that polishing is stopped when the polishing stopper layer 15 is exposed, such as an alumina-base slurry.

FIG. 8A and FIG. 8B illustrate the following step. In the step, first, a photoresist layer having a thickness of 1.0 µm, for example, is formed on the entire top surface of the layered structure. The photoresist layer is then patterned to form a mask 32 for etching portions of the magnetic layers 161P and 162P. The mask 32 covers the top surfaces of the magnetic layers 161P and 162P except the regions in which the surface 16Ca and the front end face 16Db will be formed. The distance between the medium facing surface 30 and an end of the mask 32 closer to the medium facing surface 30 falls within a range of 0.1 to 0.5 µm inclusive, for example. Next, the portions of the magnetic layers 161P and 162P are etched by ion beam etching, for example, using the mask 32. As a result, the surfaces 16Ca and 16Da and the front end face 16Db are formed on the top surfaces of the magnetic layers 161P and 162P, and the magnetic layers 161P and 162P are thereby formed into the first layer 161 and the second layer 162, respectively. When the portions of the magnetic layers 161P and 162P are etched by ion beam etching, the direction in which ion beams move should form an angle that falls within a range of 40 to 55 degrees inclusive, for example, with respect to the top surface of the substrate 1. It is thereby possible that the front end face 16Db forms an angle that falls within a range of 80 to 90 degrees inclusive with respect to the top surface of the substrate 1. In addition, this etching is performed such that the second side A2 of the end face of the pole layer 16 located in the medium facing surface 30 is disposed at a height that falls within the range between the height at which the top surface of the nonmagnetic metal layer 13 as initially formed is located and the height at which the bottom surface thereof is located. Therefore, the nonmagnetic metal layer 13 serves as the reference that indicates the level at which this etching is stopped. The portions of the magnetic layers 161P and 162P are etched in the manner thus described, so that each of the track width and the thickness of the pole layer 16 taken in the medium facing surface 30 is controlled to be nearly uniform. It is thereby possible to control the thickness of the pole layer 16 and the track width with precision. If the nonmagnetic metal layer 13 has a relatively great thickness within the above-mentioned range, in particular, it is preferred that the inner wall of the opening 13a is orthogonal to the top surface of the substrate 1. Such an example will be given as a modification example later. Next, the mask 32 is removed.

Figures 9A, 9B:
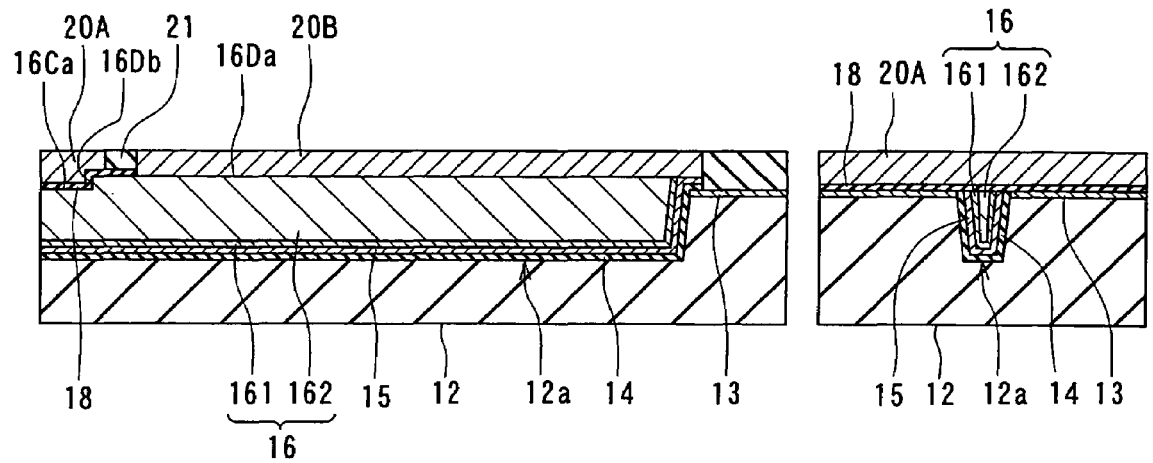
FIG. 9A and FIG. 9B are views for illustrating a step that follows the step shown in FIG. 8A and FIG. 8B.

FIG. 9A and FIG. 9B illustrate the following step. In the step, first, the gap layer 18 is formed on the entire top surface of the layered structure. The gap layer 18 is formed by sputtering or CVD, for example. If the gap layer 18 is formed by CVD, it is preferred to employ ALCVD. If the gap layer 18 is formed by ALCVD, it is preferred that the gap layer 18 is made of alumina. The gap layer 18 formed by ALCVD exhibits a good step coverage. Therefore, it is possible to form the gap layer 18 that is uniform on the uneven pole layer 16 by forming the gap layer 18 by ALCVD.

Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. The first layer 20A and the yoke layer 20B may be formed by frame plating or by making a magnetic layer through sputtering and then selectively etching the magnetic layer. Selective etching of the magnetic layer may be performed by, for example, making an alumina layer on the magnetic layer, making a mask on the alumina layer by frame plating, and etching the alumina layer and the magnetic layer using the mask. Next, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened.

Figures 10A, 10B:
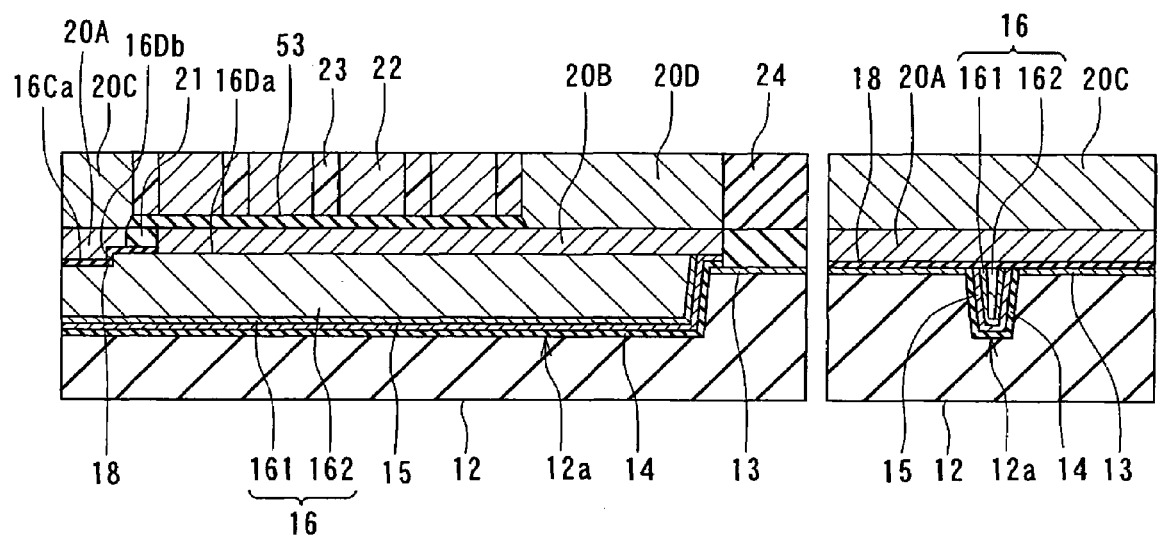
FIG. 10A and FIG. 10B are views for illustrating a step that follows the step shown in FIG. 9A and FIG. 9B.

FIG. 10A and FIG. 10B illustrate the following step. In the step, first, an insulating layer 53 is formed on regions of the top surfaces of the yoke layer 20B and the nonmagnetic layer 21 in which the coil 22 will be disposed. Next, the coil 22 is formed by frame plating, for example, such that at least part of the coil 22 is disposed on the insulating layer 53. Next, the second layer 20C and the coupling layer 20D are formed by frame plating, for example. Alternatively, the coil 22 may be formed after the second layer 20C and the coupling layer 20D are formed.

Next, the insulating layer 23 made of photoresist, for example, is selectively formed around the coil 22 and in the space between the respective adjacent turns of the coil 22. Next, the insulating layer 24 having a thickness of 4 to 4.5 µm, for example, is formed on the entire top surface of the layered structure. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened.

Figure 11A:
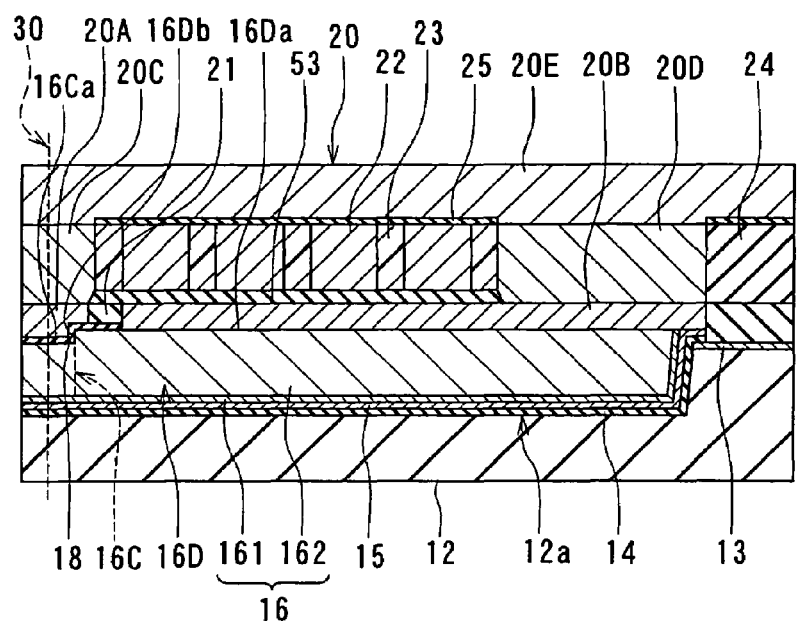
FIG. 11A and FIG. 11B are views for illustrating a step that follows the step shown in FIG. 10A and FIG. 10B.
Figure 11B:
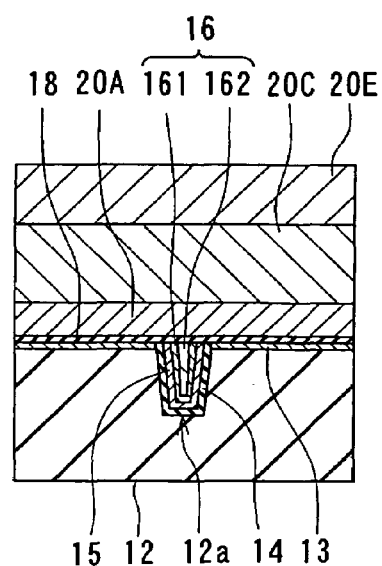

FIG. 11A and FIG. 11B illustrate the following step. In the step, first, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head, the coil 22 generates a magnetic field that corresponds to the data to be written on the medium. The pole layer 16 and the shield layer 20 form a magnetic path through which a magnetic flux corresponding to the magnetic field generated by the coil 22 passes. The pole layer 16 allows the flux corresponding to the field generated by the coil 22 to pass and generates a write magnetic field used for writing the data on the medium through the use of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield layer 20 is disposed forward of the end face of the pole layer 16 along the direction T of travel of the recording medium (that is, on the air-outflow-end side of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end face of the pole layer 16 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, as shown in FIG. 1, the end face of the pole layer 16 located in the medium facing surface 30 has a width that decreases as the distance from the first side A1 decreases. It is thereby possible to prevent the problems resulting from the skew.

According to the embodiment, the pole layer 16 incorporates the first portion 16C and the second portion 16D. The first portion 16C has the end face located in the medium facing surface 30, and has a thickness that does not change in accordance with the distance from the medium facing surface 30. The second portion 16D is located farther from the medium facing surface 30 than the first portion 16C and has a thickness greater than that of the first portion 16C. The surface 16Ca of the first portion 16C farther from the substrate 1 is located closer to the substrate 1 than the surface 16Da of the second portion 16D farther from the substrate 1. The second portion 16D has the front end face 16Db that couples the surface 16Ca of the first portion 16C farther from the substrate 1 to the surface 16Da of the second portion 16D farther from the substrate 1. The end face of the pole layer 16 located in the medium facing surface 30 has the first side A1 close to the substrate 1 and the second side A2 opposite to the first side A1, and the second side A2 defines the track width. The surface 16Da of the second portion 16D farther from the substrate 1 is formed by polishing such as CMP. The surface 16Ca of the first portion 16C farther from the substrate 1 is formed by etching such as ion beam etching. Etching for forming the surface 16Ca is performed only on portions of the magnetic layers 161P and 162P near the medium facing surface 30 after the top surfaces of the magnetic layers 161P and 162P are flattened by CMP, for example. It is thereby possible to perform this etching with precision. Therefore, according to the embodiment, it is possible to control the thickness of the first portion 16C, that is, the thickness of the pole layer 16 taken in the medium facing surface 30, with precision. Furthermore, it is thereby possible to control the track width with precision.

According to the embodiment, in particular, etching of the portions of the magnetic layers 161P and 162P is performed such that the second side A2 of the end face of the pole layer 16 located in the medium facing surface 30 is disposed at a height that falls within the range between the height at which the top surface of the nonmagnetic metal layer 13 as initially formed is located and the height at which the bottom surface thereof is located. It is thereby possible to control the thickness of the pole layer 16 taken in the medium facing surface 30 and the track width with precision.

According to the embodiment, the second portion 16D of the pole layer 16 has a thickness greater than that of the first portion 16C. As a result, it is possible to introduce a magnetic flux of great magnitude to the medium facing surface 30 through the pole layer 16 while the thickness of the pole layer 16 taken in the medium facing surface 30 is reduced. It is thereby possible to implement a sufficient overwrite property.

According to the embodiment, the throat height TH is not defined by the end of the first layer 20A farther from the medium facing surface 30 but by the point at which the gap layer 18 first bends when seen from the medium facing surface 30, that is, the point at which the bottom surface of the first layer 20A first bends when seen from the medium facing surface 30. As a result, it is possible to reduce the throat height TH while the volume of the first layer 20A is sufficiently increased. It is thereby possible to improve the overwrite property.

Flux leakage from the pole layer 16 is likely to occur in the portion of the pole layer 16 where the thickness changes, that is, in a neighborhood of the front end face 16Db. If the flux leaking from this portion reaches the medium facing surface 30 and further leaks to the outside from the medium facing surface 30, the effective track width will increase and/or the problems resulting from the skew will occur. According to the embodiment, the shield layer 20 has the portion located between the front end face 16Db and the medium facing surface 30 in the region closer to the substrate 1 than the surface 16Da of the second portion 16D of the pole layer 16 farther from the substrate 1. Therefore, the leakage flux from the portion of the pole layer 16 in which the thickness changes is taken in by the shield layer 20. As a result, the flux leaking from somewhere in the middle of the pole layer 16 is prevented from leaking to the outside from the medium facing surface 30.

According to the embodiment, the magnetic head comprises the yoke layer 20B that touches the surface of the second portion 16D of the pole layer 16 farther from the substrate 1. An end of the yoke layer 20B closer to the medium facing surface 30 is located farther from the medium facing surface than the location of the boundary between the surfaces 16Da and 16Db of the pole layer 16. Therefore, the magnetic layer made up of a combination of the pole layer 16 and the yoke layer 20B being considered, the thickness of this magnetic layer is reduced by two steps as the distance from the medium facing surface 30 decreases. As a result, it is possible to introduce a magnetic flux of great magnitude to the medium facing surface 30 while preventing saturation of flux halfway through the magnetic layer.

According to the embodiment, the top surface of the pole layer 16 bends in the neighborhood of the medium facing surface 30. It is thereby possible to suppress generation of residual magnetization in the direction orthogonal to the medium facing surface 30 in a portion of the pole layer 16 near the medium facing surface 30 after writing is performed. As a result, it is possible to suppress the occurrence of a phenomenon in which data stored on the recording medium is erased because of the residual magnetization in the pole layer 16 after writing is performed.

According to the embodiment, the pole layer 16 is disposed in the groove 12a of the encasing layer 12 made of a nonmagnetic material with the nonmagnetic film 14 and the polishing stopper layer 15 disposed between the pole layer 16 and the groove 12a. Consequently, the pole layer 16 is smaller than the groove 12a in width. It is thereby possible to easily form the groove 12a and to easily reduce the width of the pole layer 16 and the width of the top surface of the track width defining portion 16A that defines the track width, in particular. As a result, according to the embodiment, it is possible to easily implement the track width that is smaller than the minimum track width that can be formed by photolithography and to control the track width with accuracy.

Modification Examples

Figure 12:
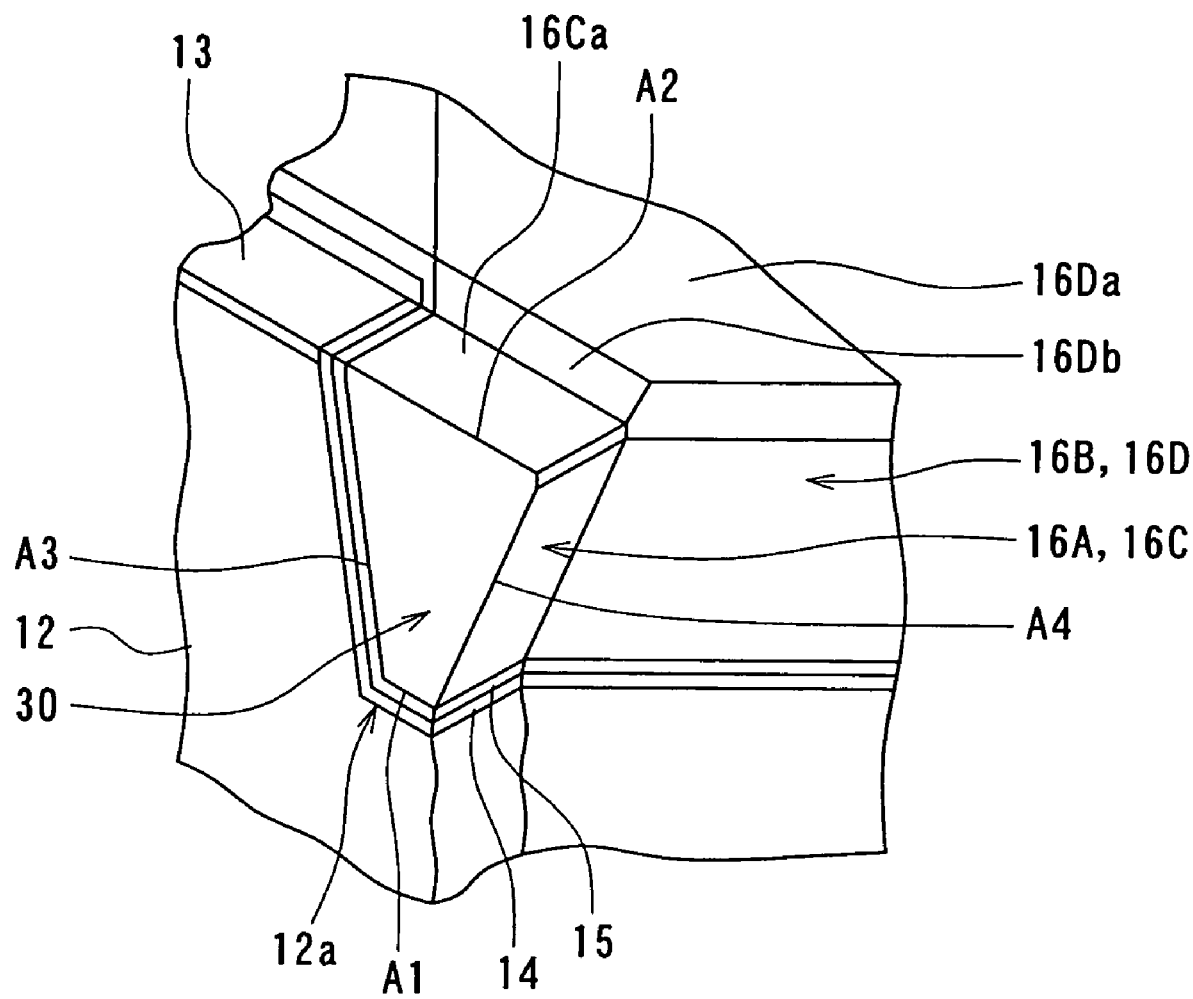
FIG. 12 is a perspective view illustrating a first modification example of the magnetic head of the first embodiment of the invention.

First to seventh modification examples of the embodiment will now be described. FIG. 12 is a perspective view illustrating a portion of the pole layer 16 near the medium facing surface 30 of the magnetic head of the first modification example. In the first modification example, the front end face 16Db of the second portion 16D of the pole layer 16 is tilted with respect to the direction orthogonal to the top surface of the substrate 1 such that the thickness of the pole layer 16 gradually increases as the distance from the medium facing surface 30 increases in the region in which the front end face 16Db is located. The front end face 16Db preferably forms an angle that is equal to or greater than 30 degrees and smaller than 80 degrees with respect to the top surface of the substrate 1. In the first modification example, when portions of the magnetic layers 161P and 162P are etched by ion beam etching to form the surfaces 16Ca and 16Db, the direction in which ion beams move forms an angle of 75 degrees, for example, with respect to the direction orthogonal to the top surface of the substrate 1. In this case, the front end face 16Db forms an angle of approximately 45 degrees with respect to the top surface of the substrate 1. The remainder of configuration, function and effects of the first modification example are similar to those of the magnetic head illustrated in FIG. 1 to FIG. 4.

Figure 13:
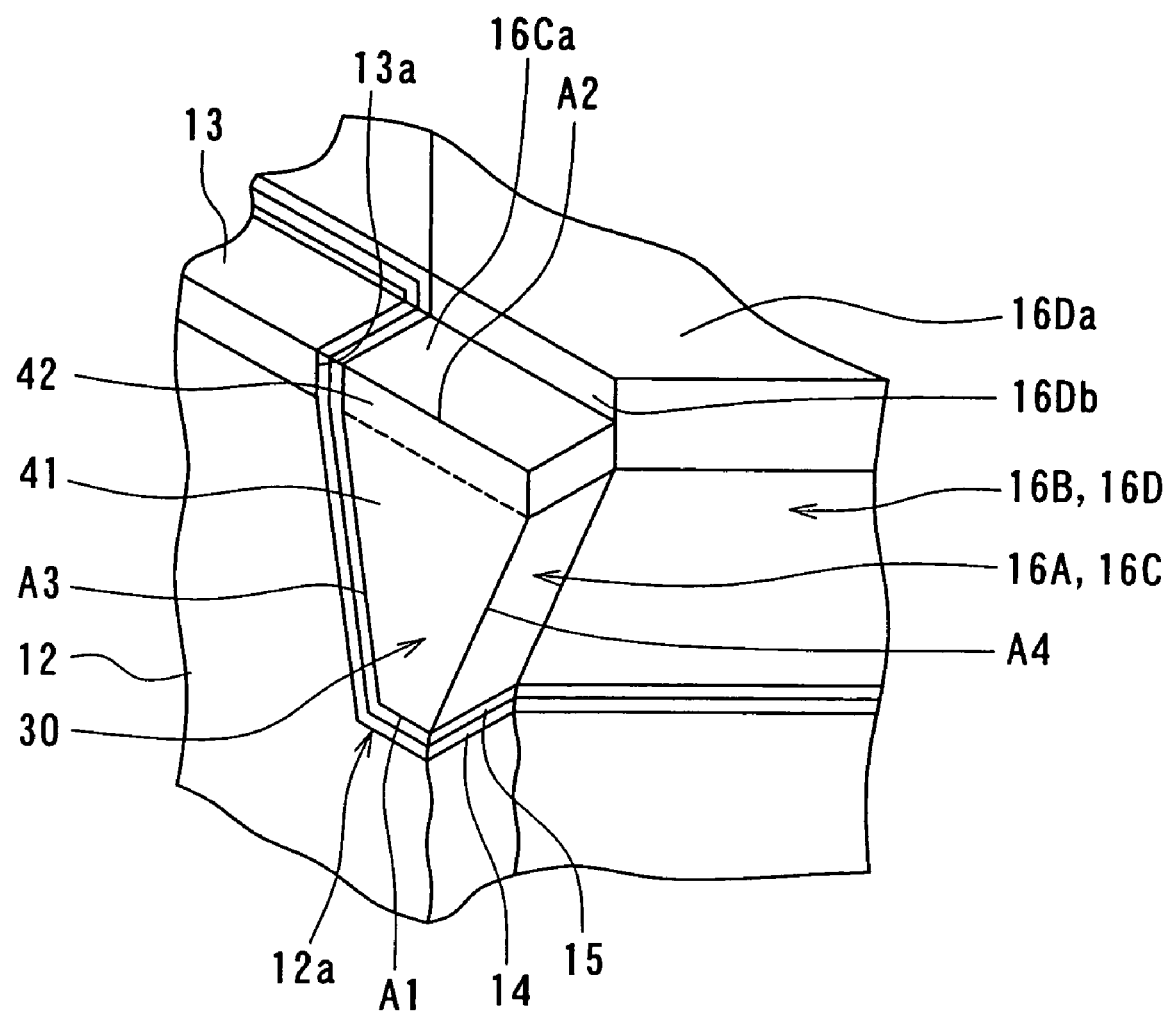
FIG. 13 is a perspective view illustrating a second modification example of the magnetic head of the first embodiment of the invention.

FIG. 13 is a perspective view illustrating a portion of the pole layer 16 near the medium facing surface 30 of the magnetic head of the second modification example. In the magnetic head of the second modification example, the inner wall of the opening 13a of the nonmagnetic metal layer 13 is orthogonal to the top surface of the substrate 1. In the second modification example, the end face of the pole layer 16 located in the medium facing surface 30 has: a first region 41; and a second region 42 that is connected to the first region 41 and located farther from the substrate 1 than the first region 41. The first region 41 has a width that decreases as the distance from the substrate 1 decreases. The second region 42 has a uniform width that defines the track width. In the medium facing surface 30, the nonmagnetic metal layer 13 exists on both sides of the second region 42, the sides being opposed to each other in the direction of track width.

In the second modification example, the step of etching the magnetic layers 161P and 162P to form the surfaces 16Ca and 16Db is performed such that, the second side A2 of the end face of the pole layer 16 located in the medium facing surface 30 is located at a height that falls within a range between the height at which the top surface of the nonmagnetic metal layer 13 as initially formed is located and the height at which the bottom surface thereof is located. In the second modification example, the length of the second side A2 is uniform and equal to the width of the second region 42, regardless of the height at which the second side A2 is located in the medium facing surface 30 within the range between the height at which the top surface of the nonmagnetic metal layer 13 as initially formed is located and the height at which the bottom surface thereof is located. As a result, according to the second modification example, it is possible to control the track width with precision.

The etching rate of the magnetic layers 161P and 162P made of a magnetic metal material and that of the nonmagnetic metal layer 13 made of a nonmagnetic metal material are nearly equal. Therefore, according to the second modification example, it is possible to etch the top surfaces of the magnetic layers 161P and 162P and the nonmagnetic metal layer 13 with precision. It is thereby possible to control the thickness of the pole layer 16 taken in the medium facing surface 30 with precision. The remainder of configuration, function and effects of the second modification example are similar to those of the magnetic head illustrated in FIG. 1 to FIG. 4.

FIG. 14A and FIG. 14B illustrate the third modification example. FIG. 14A shows a cross section of the main part of the magnetic head orthogonal to the medium facing surface and the substrate. FIG. 14B shows a cross section of the main part of the magnetic head near the medium facing surface that is parallel to the medium facing surface. In FIG. 14A and FIG. 14B, the portions closer to the substrate 1 than the encasing layer 12 are omitted.

In the third modification example, the first layer 20A is located only in a region above the first portion 16C of the pole layer 16. In the third modification example, the throat height TH is defined by an end of the first layer 20A farther from the medium facing surface 30. That is, the throat height TH is the distance between the medium facing surface 30 and the end of the first layer 20A farther from the medium facing surface 30. The remainder of configuration, function and effects of the third modification example are similar to those of the magnetic head illustrated in FIG. 1 to FIG. 4.

FIG. 15A and FIG. 15B illustrate the fourth modification example. FIG. 15A shows a cross section of the main part of the magnetic head orthogonal to the medium facing surface and the substrate. FIG. 15B shows a cross section of the main part of the magnetic head near the medium facing surface that is parallel to the medium facing surface. In FIG. 15A and FIG. 15B, the portions closer to the substrate 1 than the encasing layer 12 are omitted.

In the fourth modification example, a coupling layer 20F is provided in place of the yoke layer 20B illustrated in FIG. 3. The coupling layer 20F is made of a material the same as that of the yoke layer 20B. The bottom surface of the coupling layer 20F touches the top surface of the pole layer 16. The top surface of the coupling layer 20F touches the bottom surface of the coupling layer 20D. The coupling layer 20F is disposed only in a region below the coupling layer 20D. The nonmagnetic layer 21 is disposed around the coupling layer 20F. In the fourth modification example, the insulating layer 53 is not provided, and the coil 22 is disposed on the nonmagnetic layer 21. The remainder of configuration, function and effects of the fourth modification example are similar to those of the magnetic head illustrated in FIG. 1 to FIG. 4.

FIG. 16A and FIG. 16B illustrate the fifth modification example. FIG. 16A shows a cross section of the main part of the magnetic head orthogonal to the medium facing surface and the substrate. FIG. 16B shows a cross section of the main part of the magnetic head near the medium facing surface that is parallel to the medium facing surface. In FIG. 16A and FIG. 16B, the portions closer to the substrate 1 than the encasing layer 12 are omitted.

In the fifth modification example, the first layer 20A of the fourth modification example is located only in a region above the first portion 16C of the pole layer 16. In the fifth modification example, the throat height TH is defined by an end of the first layer 20A farther from the medium facing surface 30. That is, the throat height TH is the distance between the medium facing surface 30 and the end of the first layer 20A farther from the medium facing surface 30. The remainder of configuration, function and effects of the fifth modification example are similar to those of the fourth modification example.

FIG. 17A and FIG. 17B illustrate the sixth modification example. FIG. 17A shows a cross section of the main part of the magnetic head orthogonal to the medium facing surface and the substrate. FIG. 17B shows a cross section of the main part of the magnetic head near the medium facing surface that is parallel to the medium facing surface. In FIG. 17A and FIG. 17B, only the portions located above the coil 9 and the insulating layers 10 and 11 are shown.

In the sixth modification example, an insulating layer 51 that covers the coil 9 and the insulating layers 10 and 11 is provided, and a lower yoke layer 52 made of a magnetic material is provided on the insulating layer 51. An end of the lower yoke layer 52 closer to the medium facing surface 30 is located at a distance from the medium facing surface 30. In the sixth modification example, the encasing layer 12 is provided to cover the lower yoke layer 52. A portion of the groove 12a of the encasing layer 12 reaches the top surface of the lower yoke layer 52. On the top surface of the lower yoke layer 52, portions of the nonmagnetic film 14 and the polishing stopper layer 15 located in the groove 12a are selectively removed by etching. The bottom surface of the pole layer 16 located in the groove 12a touches the top surface of the lower yoke layer 52. The remainder of configuration, function and effects of the sixth modification example are similar to those of the fourth modification example.

Figures 18A, 18B:
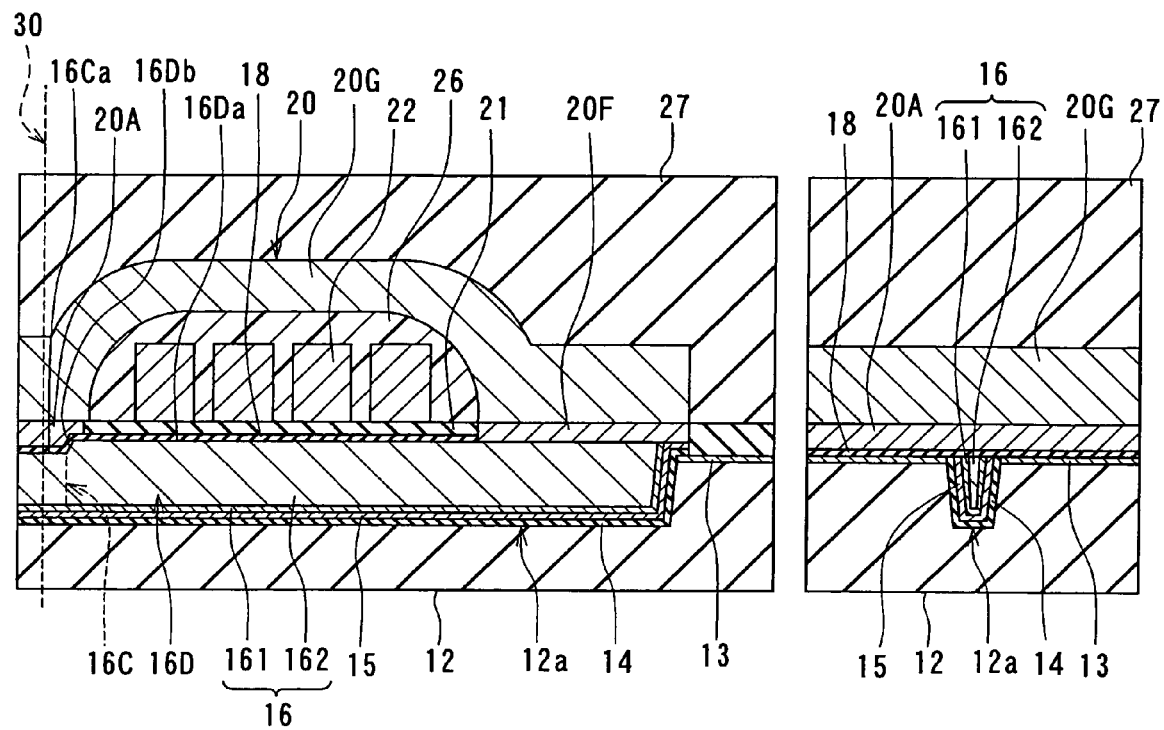
FIG. 18A and FIG. 18B are views for illustrating a seventh modification example of the magnetic head of the first embodiment of the invention.

FIG. 18A and FIG. 18B illustrate the seventh modification example. FIG. 18A shows a cross section of the main part of the magnetic head orthogonal to the medium facing surface and the substrate. FIG. 18B shows a cross section of the main part of the magnetic head near the medium facing surface that is parallel to the medium facing surface. In FIG. 18A and FIG. 18B, the portions closer to the substrate 1 than the encasing layer 12 are omitted.

The magnetic head of the seventh modification example comprises an insulating layer 26 covering at least part of the coil 22 in place of the insulating layers 23 and 25 of the fourth modification example. The shield layer 20 of the seventh modification example comprises a second layer 20G in place of the second layer 20C, the coupling layer 20D and the third layer 20E of the fourth modification example. The second layer 20G has an end located in the medium facing surface 30, and is disposed to couple the first layer 20A to the coupling layer 20F. The second layer 20G includes a portion located on a side of the at least part of the coil 22 covered with the insulating layer 26, the side being opposite to the pole layer 16. The second layer 20G includes a portion located between the medium facing surface 30 and the coil 22. In this portion the distance between the end located in the medium facing surface 30 and the other end increases as the distance from the first layer 20A increases. The second layer 20G may be made of any of CoFeN, CoNiFe, NiFe, and CoFe, for example.

The magnetic head of the seventh modification example comprises an insulating layer 27 in place of the insulating layer 24 of the fourth modification example. The insulating layer 27 is disposed around the second layer 20G The insulating layer 27 is made of alumina, for example. The remainder of configuration, function and effects of the magnetic head of the seventh modification example are similar to those of the fourth modification example.

FIG. 14A to FIG. 18A and FIG. 14B to FIG. 18B illustrate the example in which the front end face 16Db of the pole layer 16 is tilted with respect to the direction orthogonal to the top surface of the substrate 1 such that the thickness of the pole layer 16 gradually increases as the distance from the medium facing surface 30 increases in the region in which the front end face 16Db is located. However, the front end face 16Db may be nearly orthogonal to the top surface of the substrate 1 in any of the third to seventh modification examples.

Second Embodiment

A magnetic head and a method of manufacturing the same of a second embodiment of the invention will now be described. Reference is now made to FIG. 19A to FIG. 22A and FIG. 19B to FIG. 22B to describe the method of manufacturing the magnetic head of the second embodiment. FIG. 19A to FIG. 22A each illustrate a cross section of a layered structure obtained in the course of manufacturing process of the magnetic head, the cross section being orthogonal to the medium facing surface and the substrate. FIG. 19B to FIG. 22B each illustrate a cross section of a portion of the layered structure near the medium facing surface, the cross section being parallel to the medium facing surface. In FIG. 19A to FIG. 22A and FIG. 19B to FIG. 22B, the portions closer to the substrate 1 than the encasing layer 12 are omitted.

Figures 19A, 19B:
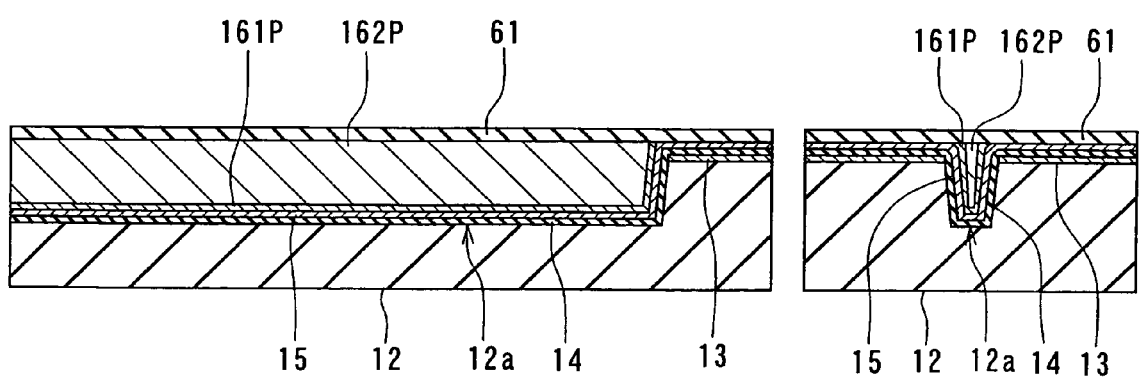
FIG. 19A and FIG. 19B are views for illustrating a step of a method of manufacturing a magnetic head of a second embodiment of the invention.

The method of manufacturing the magnetic head of the second embodiment includes the steps up to the step of flattening the top surfaces of the polishing stopper layer 15, the first magnetic layer 161P and the second magnetic layer 162P, as shown in FIG. 7A and FIG. 7B, the steps being the same as those of the first embodiment. FIG. 19A and FIG. 19B illustrate the following step. In the step, first, a nonmagnetic film 61 made of a nonmagnetic material such as alumina is formed on the entire top surface of the layered structure. The nonmagnetic film 61 has a thickness of 0.1 to 0.2 µm, for example.

Figures 20A, 20B:
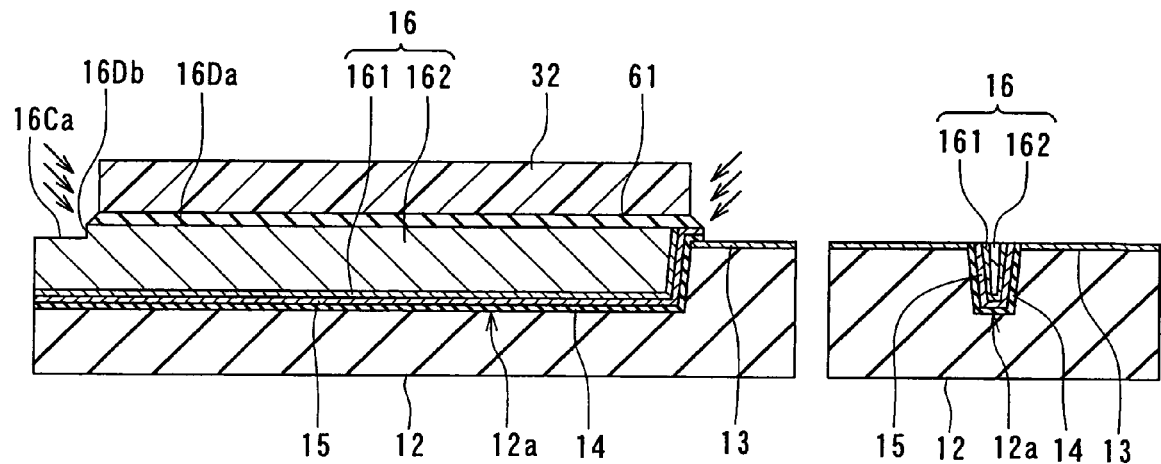
FIG. 20A and FIG. 20B are views for illustrating a step that follows the step shown in FIG. 19A and FIG. 19B.

FIG. 20A and FIG. 20B illustrate the following step. In the step, first, a photoresist layer having a thickness of 1.0 µm, for example, is formed on the entire top surface of the layered structure. The photoresist layer is then patterned to form the mask 32 for etching portions of the magnetic layers 161P and 162P and the nonmagnetic film 61. The mask 32 is disposed above the top surfaces of the magnetic layers 161P and 162P except the regions in which the surface 16Ca and the front end face 16Db will be formed. Next, a portion of the nonmagnetic film 61 is etched by reactive ion etching, for example, using the mask 32. Next, the portions of the magnetic layers 161P and 162P are etched by ion beam etching, for example, using the mask 32. As a result, the surfaces 16Ca and 16Da and the front end face 16Db are formed on the top surfaces of the magnetic layers 161P and 162P, and the magnetic layers 161P and 162P are thereby formed into the first layer 161 and the second layer 162, respectively. The etching is stopped at the level the same as that of the first embodiment. Next, the mask 32 is removed.

Figures 21A, 21B:
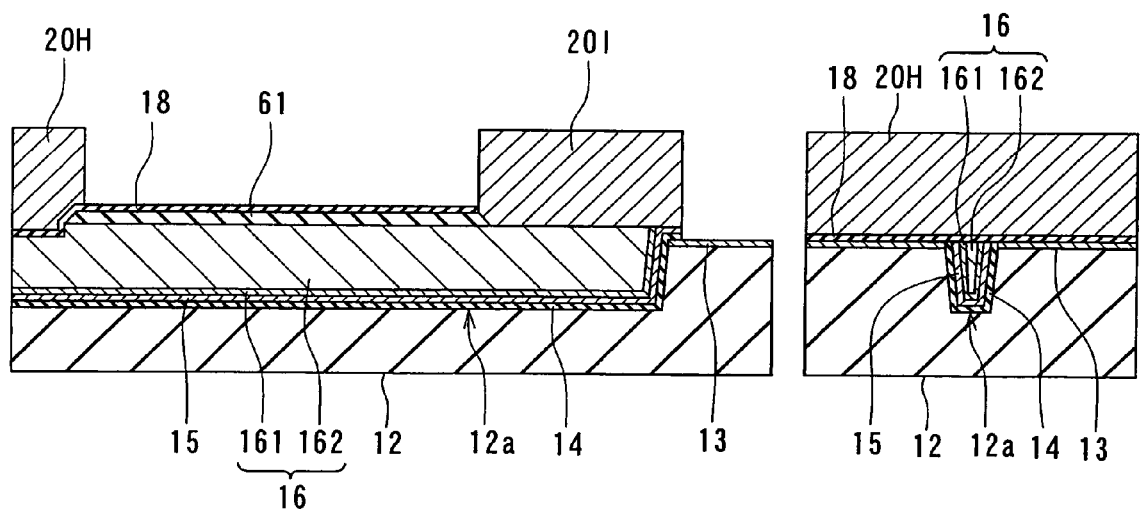
FIG. 21A and FIG. 21B are views for illustrating a step that follows the step shown in FIG. 20A and FIG. 20B.

FIG. 21A and FIG. 21B illustrate the following step. In the step, first, the gap layer 18 is formed on the entire top surface of the layered structure. The material and forming method of the gap layer 18 are the same as those of the first embodiment.

Next, a portion of the gap layer 18 away from the medium facing surface 30 is selectively etched to form an opening in the gap layer 18. Next, a first layer 20H of the shield layer 20 is formed on the gap layer 18, and a coupling layer 20I of the shield layer 20 is formed on a portion of the pole layer 16 where the opening of the gap layer 18 is formed. The first layer 20H is disposed not only in a region above the first portion 16C of the pole layer 16 but also in a region above a portion of the second portion 16D and a portion of the nonmagnetic film 61. The thickness of the first layer 20H and the coupling layer 20I falls within a range of 1.5 to 3.0 μm inclusive, for example. The method of forming the first layer 20H and the coupling layer 20I is the same as the method of forming the first layer 20A and the yoke layer 20B of the first embodiment.

In the second embodiment the shield layer 20 is made up of the first layer 20H and the coupling layer 20I, and a second layer 20J that will be described later. Each of the first layer 20H, the coupling layer 20I and the second layer 20J is made of a magnetic material. The layers 20H to 20J may be made of any of CoFeN, CoNiFe, NiFe and CoFe, for example.

FIG. 22A and FIG. 22B illustrate the following step. In the step, first, the coil 22 is formed by frame plating, for example, such that at least part of the coil 22 is disposed above the nonmagnetic film 61. Alternatively, the first layer 20H and the coupling layer 20I may be formed after the coil 22 is formed.

Next, the insulating layer 23 made of photoresist, for example, is selectively formed around the coil 22 and in the space between the respective adjacent turns of the coil 22. Next, the insulating layer 24 having a thickness of 4 to 4.5 μm, for example, is formed on the entire top surface of the layered structure. Next, the insulating layer 24 is polished by CMP, for example, so that the first layer 20H, the coupling layer 20I and the coil 22 are exposed, and the top surfaces of the first layer 20H, the coupling layer 20I, the coil 22 and the insulating layers 23 and 24 are thereby flattened. Next, the insulating layer 25 is formed on the coil 22 and the insulating layers 23 and 24. Next, the second layer 20J is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The magnetic head of the second embodiment comprises the nonmagnetic film 61 disposed on the surface 16Da of the second portion 16D of the pole layer 16 farther from the substrate 1. In the second embodiment, the shield layer 20 incorporates: the first layer 20H disposed adjacent to the gap layer 18; the second layer 20J disposed on a side of the first layer 20H opposite to the gap layer 18; and the coupling layer 20I that couples the second layer 20J to the pole layer 16 in the position away from the medium facing surface 30. The shield layer 20 has a portion that is sandwiched between the front end face 16Db and the medium facing surface 30 and that is located in a region closer to the substrate 1 than the surface 16Da of the second portion 16D of the pole layer 16 farther from the substrate 1. The first layer 20H has a portion located above the nonmagnetic film 61.

In the second embodiment, as in the first embodiment, the throat height TH is the distance between the medium facing surface 30 and the point at which the gap layer 18 first bends when seen from the medium facing surface 30, that is, the point at which the bottom surface of the first layer 20H first bends when seen from the medium facing surface 30. In the second embodiment, the gap layer 18 and the nonmagnetic film 61 are disposed between the pole layer 16 and the first layer 20H in the region farther from the medium facing surface than the point at which the gap layer 18 first bends when seen from the medium facing surface 30. Consequently, flux leakage between the pole layer 16 and the shield layer 20 in this region is less, compared with the case in which the nonmagnetic film 61 is not provided. As a result, according to the embodiment, it is possible to introduce a magnetic flux of great magnitude to the medium facing surface 30 and it is thereby possible to improve the overwrite property. The remainder of configuration, function and effects of the second embodiment are similar to those of the first embodiment.

Modification Examples

First and second modification examples of the second embodiment will now be described. FIG. 23A and FIG. 23B illustrate the first modification example. FIG. 23A shows a cross section of the main part of the magnetic head orthogonal to the medium facing surface and the substrate. FIG. 23B shows a cross section of the main part of the magnetic head near the medium facing surface that is parallel to the medium facing surface. In FIG. 23A and FIG. 23B, the portions closer to the substrate 1 than the encasing layer 12 are omitted.

In the first modification example, the shield layer 20 is made up of the first layer 20A, the second layer 20C, the coupling layers 20F and 20D, and the third layer 20E, as in the fifth modification example of the first embodiment. The first layer 20A is located only in a region above the first portion 16C of the pole layer 16. In the first modification example, the nonmagnetic layer 21 disposed around the coupling layer 20F is provided. In the first modification example, the throat height TH is defined by an end of the first layer 20A farther from the medium facing surface 30. That is, the throat height TH is the distance between the medium facing surface 30 and the end of the first layer 20A farther from the medium facing surface 30. The remainder of configuration, function and effects of the first modification example are similar to those of the magnetic head illustrated in FIG. 22A and FIG. 22B.

FIG. 24A and FIG. 24B illustrate the second modification example. FIG. 24A shows a cross section of the main part of the magnetic head orthogonal to the medium facing surface and the substrate. FIG. 24B shows a cross section of the main part of the magnetic head near the medium facing surface that is parallel to the medium facing surface. In FIG. 24A and FIG. 24B, the portions closer to the substrate 1 than the encasing layer 12 are omitted.

In the second modification example, the shield layer 20 is made up of the first layer 20A, the second layer 20C, the coupling layers 20F and 20D, and the third layer 20E, as in the first modification example. In the second modification example, the nonmagnetic layer 21 disposed around the coupling layer 20F is provided. In the second modification example, the first layer 20A is located not only in a region above the first portion 16C of the pole layer 16 but also in a region above a portion of the second portion 16D. In the second modification example, the throat height TH is defined not by an end of the first layer 20A farther from the medium facing surface 30, but by the point at which the gap layer 18 first bends when seen from the medium facing surface 30, that is, the point at which the bottom surface of the first layer 20H first bends when seen from the medium facing surface 30. That is, the throat height TH is the distance between the medium facing surface 30 and the point at which the gap layer 18 first bends when seen from the medium facing surface 30. The remainder of configuration, function and effects of the second modification example are similar to those of the magnetic head illustrated in FIG. 22A and FIG. 22B.

It is possible to provide modification examples of the second embodiment that are similar to the first, second, sixth and seventh modification examples of the first embodiment.

Third Embodiment

Reference is now made to FIG. 25A to FIG. 28A and FIG. 25B to FIG. 28B to describe a magnetic head and a method of manufacturing the same of a third embodiment of the invention. FIG. 25A to FIG. 28A each illustrate a cross section of a layered structure obtained in the course of manufacturing process of the magnetic head, the cross section being orthogonal to the medium facing surface and the substrate. FIG. 25B to FIG. 28B each illustrate a cross section of a portion of the layered structure near the medium facing surface, the cross section being parallel to the medium facing surface. In FIG. 25A to FIG. 28A and FIG. 25B to FIG. 28B, the portions closer to the substrate 1 than the encasing layer 12 are omitted.

Figures 28A, 28B:
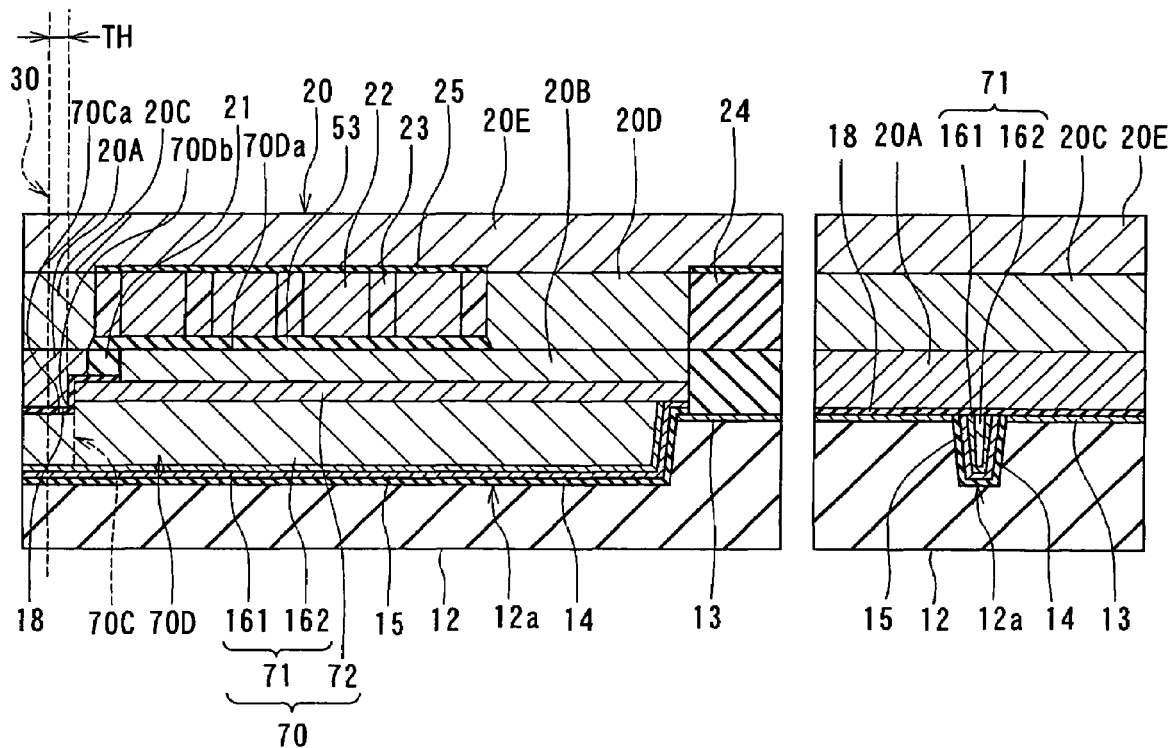
FIG. 28A and FIG. 28B are views for illustrating a step that follows the step shown in FIG. 27A and FIG. 27B.

Reference is now made to FIG. 28A and FIG. 28B to describe the configuration of the magnetic head of the third embodiment. The magnetic head of the embodiment comprises a pole layer 70 in place of the pole layer 16 of the first embodiment. The pole layer 70 incorporates a lower layer 71 and an upper layer 72 that are stacked. The upper layer 72 has a saturation flux density greater than that of the lower layer 71. The lower layer 71 is made up of the first layer 161 and the second layer 162 of the first embodiment. The lower layer 71 may be made of CoFe, FeNi or CoNiFe, for example. The upper layer 72 may be made of CoFe, CoFeZrO or CoFeN, for example. Each of the lower layer 71 and the upper layer 72 has a saturation flux density of 2.0 to 2.4 T, for example. However, as mentioned above, a combination in which the saturation flux density of the upper layer 72 is greater is chosen for the saturation flux densities of the lower layer 71 and the upper layer 72.

The pole layer 70 has the track width defining portion and the wide portion as the pole layer 16 of the first embodiment. The pole layer 70 incorporates: a first portion 70C having an end face located in the medium facing surface 30; and a second portion 70D located farther from the medium facing surface 30 than the first portion 70C and having a thickness greater than that of the first portion 70C. The first portion 70C has a thickness that does not change in accordance with the distance from the medium facing surface 30.

A surface (a top surface) 70Ca of the first portion 70C farther from the substrate 1 is located closer to the substrate 1 than a surface (a top surface) 70Da of the second portion 70D farther from the substrate 1. The second portion 70D has a front end face 70Db that couples the surface 70Ca of the first portion 70C farther from the substrate 1 to the surface 70Da of the second portion 70D farther from the substrate 1. The front end face 70Db may be nearly orthogonal to the top surface of the substrate 1. As in the first embodiment, the front end face 70Db nearly orthogonal to the top surface of the substrate 1 means that the front end face 70Db forms an angle that falls within a range of 80 to 90 degrees inclusive with respect to the top surface of the substrate 1. Alternatively, the front end face 70Db may be tilted with respect to the direction orthogonal to the top surface of the substrate 1 such that, in the region in which the front end face 70Db is located, the thickness of the pole layer 70 gradually increases as the distance from the medium facing surface 30 increases. In this case, the front end face 70Db preferably forms an angle that is equal to or greater than 30 degrees and smaller than 80 degrees with respect to the top surface of the substrate 1. FIG. 28A and FIG. 28B illustrate an example in which the front end face 70Db is nearly orthogonal to the top surface of the substrate 1.

FIG. 28A and FIG. 28B illustrate the example in which the surface 70Ca is located closer to the substrate 1 than the interface between the lower layer 71 and the upper layer 72. In this case, the front end face 70Db is formed to extend from the upper layer 72 to the lower layer 71. However, the surface 70Ca may be located at a height the same as the height at which the interface between the lower layer 71 and the upper layer 72 is located, or may be located farther from the substrate 1 than the interface between the lower layer 71 and the upper layer 72. In these cases, the front end face 70Db is formed in the upper layer 72 only.

The shield layer 20 of the third embodiment is made up of the first layer 20A, the second layer 20C, the yoke layer 20B, the coupling layer 20D, and the third layer 20E, as the shield layer 20 of the first embodiment. The bottom surface of the yoke layer 20B touches the top surface of the pole layer 70. The top surface of the yoke layer 20B touches the bottom surface of the coupling layer 20D. An end of the yoke layer 20B closer to the medium facing surface 30 is located farther from the medium facing surface 30 than the boundary between the surfaces 70Da and 70Db of the pole layer 70. The nonmagnetic layer 21 is disposed around the yoke layer 20B. The insulating layer 53 is disposed on regions of the top surfaces of the yoke layer 20B and the nonmagnetic layer 21 where the coil 22 is disposed. The coil 22 is placed on the insulating layer 53.

The shield layer 20 has a portion that is sandwiched between the front end face 70Db and the medium facing surface 30 and that is located in a region closer to the substrate 1 than the surface 70Da of the second portion 70D of the pole layer 70 farther from the substrate 1. To be specific, this portion is a portion of the first layer 20A closer to the substrate 1 than the surface 70Da. The first layer 20A is located not only in a region above the first portion 70C of the pole layer 70 but also in a region above a portion of the second portion 70D. As in the first embodiment, the throat height TH is the distance between the medium facing surface 30 and the point at which the gap layer 18 first bends when seen from the medium facing surface 30, that is, the point at which the bottom surface of the first layer 20A first bends when seen from the medium facing surface 30.

The first layer 20A may be disposed only in the region above the first portion 70C of the pole layer 70. In this case, the throat height TH is the distance between the medium facing surface 30 and an end of the first layer 20A farther from the medium facing surface 30.

The method of manufacturing the magnetic head of the third embodiment will now be described. The method includes the steps up to the step of flattening the top surfaces of the polishing stopper layer 15, the first magnetic layer 161P and the second magnetic layer 162P, as shown in FIG. 7A and FIG. 7B, the steps being the same as those of the first embodiment. FIG. 25A and FIG. 25B illustrate the following step. In the step, first, a magnetic layer 72P made of a magnetic material is formed on the entire top surface of the layered structure by sputtering or plating, for example. The magnetic layer 72P has a thickness of 0.1 to 0.3 µm, for example. The magnetic layer 72P will be patterned later to be the upper layer 72 of the pole layer 70.

FIG. 26A and FIG. 26B illustrate the following step. In the step, first, a photoresist layer having a thickness of 1.0 µm, for example, is formed on the entire top surface of the layered structure. The photoresist layer is then patterned to form the mask 32 for patterning the magnetic layer 72P and etching portions of the magnetic layers 161P and 162P. The mask 32 has a plane geometry corresponding to the surface 70Da. Next, using the mask 32, a portion of the magnetic layer 72P is etched by ion beam etching, for example, so as to pattern the magnetic layer 72P and to etch the portions of the magnetic layers 161P and 162P. As a result, the magnetic layers 161P and 162P are formed into the lower layer 71 made up of the first layer 161 and the second layer 162, and the magnetic layer 72P is formed into the upper layer 72. The surfaces 70Ca and 70Da and the front end face 70Db are formed in the pole layer 70 made up of the lower layer 71 and the upper layer 72. The etching is stopped at the level the same as that of the first embodiment. Next, the mask 32 is removed. Alternatively, the magnetic layer 72P may be patterned before the etching using the mask 32.

FIG. 27A and FIG. 27B illustrate the following step. In the step, first, the gap layer 18 is formed on the entire top surface of the layered structure. The material and forming method of the gap layer 18 are the same as those of the first embodiment. Next, a portion of the gap layer 18 at a location in which the yoke layer 20B is to be formed is selectively etched to form an opening in the gap layer 18. Next, the first layer 20A of the shield layer 20 is formed on the gap layer 18, and the yoke layer 20B is formed on a portion of the pole layer 70 where the opening of the gap layer 18 is formed. The method of forming the first layer 20A and the yoke layer 20B is the same as that of the first embodiment.

Next, the nonmagnetic layer 21 is formed on the entire top surface of the layered structure. The nonmagnetic layer 21 is then polished by CMP, for example, so that the first layer 20A and the yoke layer 20B are exposed, and the top surfaces of the first layer 20A, the yoke layer 20B and the nonmagnetic layer 21 are thereby flattened.

FIG. 28A and FIG. 28B illustrate the following step. In the step, first, the coil 22 is formed by frame plating, for example, such that at least part of the coil 22 is disposed on the nonmagnetic layer 21. Next, the second layer 20C and the coupling layer 20D are formed by frame plating, for example. Alternatively, the coil 22 may be formed after the second layer 20C and the coupling layer 20D are formed.

Next, the insulating layer 23 made of photoresist, for example, is selectively formed around the coil 22 and in the space between the respective adjacent turns of the coil 22. Next, the insulating layer 24 having a thickness of 4 to 4.5 µm, for example, is formed on the entire top surface of the layered structure. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

In the third embodiment, the pole layer 70 incorporates the lower layer 71 and the upper layer 72 that are stacked, and the upper layer 72 has a saturation flux density greater than that of the lower layer 71. According to the third embodiment, it is possible to introduce a magnetic flux of greater magnitude to the medium facing surface 30 through the pole layer 70, compared with the first embodiment. It is thereby possible to improve the overwrite property. The remainder of configuration, function and effects of the third embodiment are similar to those of the first embodiment It is possible to provide modification examples of the third embodiment that are similar to the first to seventh modification examples of the first embodiment. The shield layer 20 of the third embodiment may be made up of the first layer 20H, the coupling layer 20I and the second layer 20J, as the shield layer 20 of the second embodiment.

Fourth Embodiment

Reference is now made to FIG. 29A to FIG. 31A and FIG. 29B to FIG. 31B to describe a magnetic head and a method of manufacturing the same of a fourth embodiment of the invention. FIG. 29A to FIG. 31A each illustrate a cross section of a layered structure obtained in the course of manufacturing process of the magnetic head, the cross section being orthogonal to the medium facing surface and the substrate. FIG. 29B to FIG. 31B each illustrate a cross section of a portion of the layered structure near the medium facing surface, the cross section being parallel to the medium facing surface. In FIG. 29A to FIG. 31A and FIG. 29B too FIG. 31B, the portions closer to the substrate 1 than the encasing layer 12 are omitted.

Figures 29A, 29B:
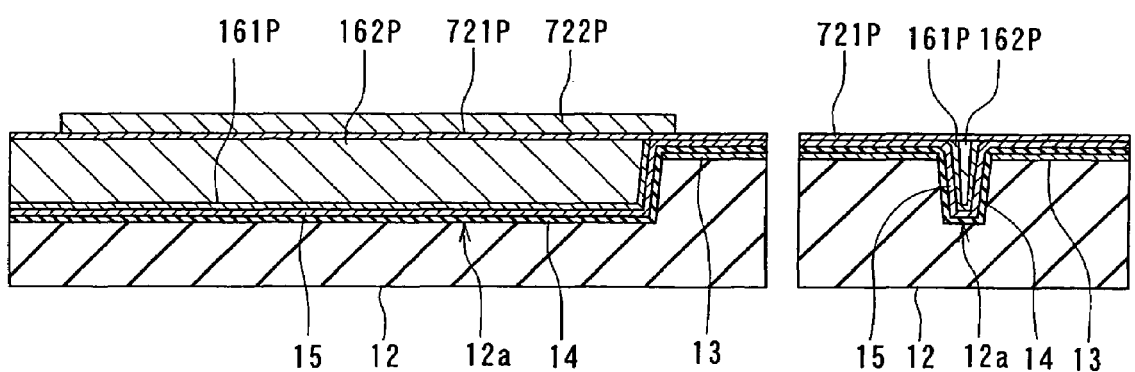
FIG. 29A and FIG. 29B are views for illustrating a step of a method of manufacturing a magnetic head of a fourth embodiment of the invention.

The method of forming the pole layer 70 of the fourth embodiment is different from that of the third embodiment. The method of the fourth embodiment includes the steps up to the step of flattening the top surfaces of the polishing stopper layer 15, the first magnetic layer 161P and the second magnetic layer 162P, as shown in FIG. 7A and FIG. 7B, the steps being the same as those of the first embodiment. The first magnetic layer 161P and the second magnetic layer 162P correspond to the magnetic layer for the lower layer of the invention. FIG. 29A and FIG. 29B illustrate the following step. In the step, first, a seed layer 721P made of a magnetic material is formed by sputtering, for example, on the entire top surface of the layered structure. The seed layer 721P may be made of any of CoFeN, CoNiFe, NiFe and CoFe, for example. The seed layer 721P has a thickness that falls within a range of 50 to 80 nm inclusive, for example.

Next, a magnetic layer 722P is formed by frame plating, for example, on the seed layer 721P. The magnetic layer 722P has a plane geometry corresponding to the surface 70Da of the pole layer 70. The magnetic layer 722P may be made of any of NiFe, CoNiFe and CoFe, for example. The magnetic layer has a thickness of 0.1 to 0.3 µm, for example. The seed layer 721P and the magnetic layer 722P correspond to the magnetic layer for the upper layer of the invention.

Figures 30A, 30B:
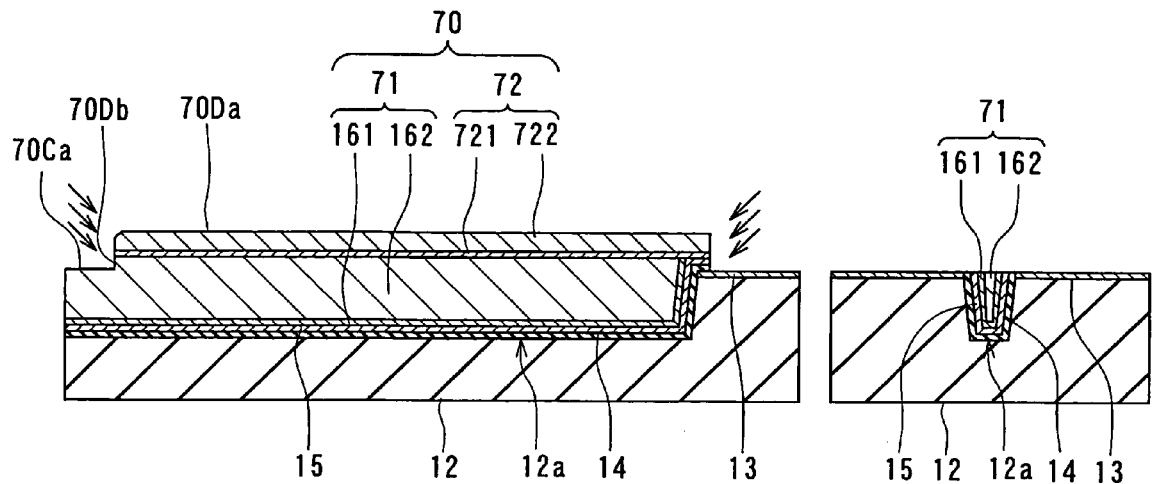
FIG. 30A and FIG. 30B are views for illustrating a step that follows the step shown in FIG. 29A and FIG. 29B.

FIG. 30A and FIG. 30B illustrate the following step. In the step, a portion of the seed layer 721P is etched by ion beam etching, for example, using the magnetic layer 722P as a mask, to pattern the seed layer 721P. Furthermore, portions of the magnetic layers 161P and 162P are etched by ion beam etching, for example, using the magnetic layer 722P and the seed layer 721P patterned as masks. As a result, the magnetic layers 161P and 162P are formed into the lower layer 71 made up of the first layer 161 and the second layer 162. In addition, the seed layer 721P and the magnetic layer 722P after the etching are formed into a first layer 721 and a second layer 722, respectively. The upper layer 72 is made up of the first layer 721 and the second layer 722. The surfaces 70Ca and 70Da and the front end face 70Db are formed in the pole layer 70 made up of the lower layer 71 and the upper layer 72. The etching is stopped at the level the same as that of the first embodiment.

Figures 31A, 31B:
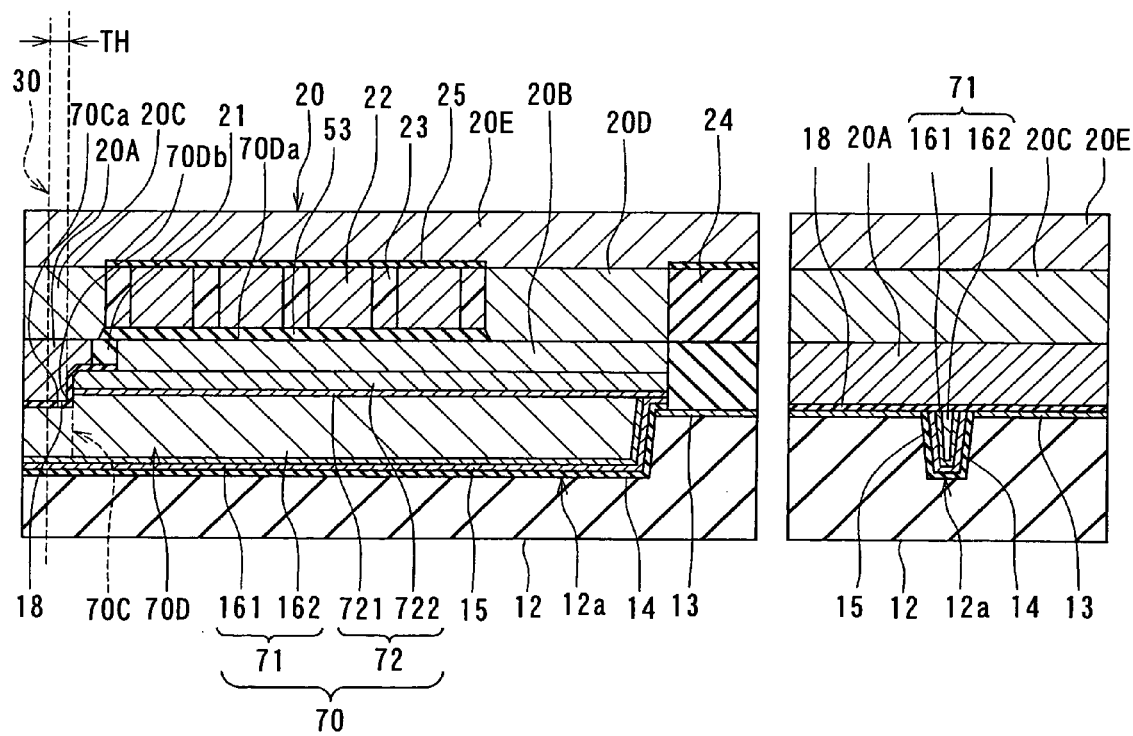
FIG. 31A and FIG. 31B are views for illustrating a step that follows the step shown in FIG. 30A and FIG. 30B.

FIG. 31A and FIG. 31B illustrate the following step. Since this step is the same as the step illustrated in FIG. 28A and FIG. 28B, the description is omitted. The remainder of configuration, function and effects of the fourth embodiment are similar to those of the third embodiment. It is possible to provide modification examples of the fourth embodiment that are similar to the first to seventh modification examples of the first embodiment. The shield layer 20 of the fourth embodiment may be made up of the first layer 20H, the coupling layer 20I and the second layer 20J, as the shield layer 20 of the second embodiment.

Fifth Embodiment

Reference is now made to FIG. 32A to FIG. 34A and FIG. 32B to FIG. 34B to describe a magnetic head and a method of manufacturing the same of a fifth embodiment of the invention. FIG. 32A to FIG. 34A each illustrate a cross section of a layered structure obtained in the course of manufacturing process of the magnetic head, the cross section being orthogonal to the medium facing surface and the substrate. FIG. 32B to FIG. 34B each illustrate a cross section of a portion of the layered structure near the medium facing surface, the cross section being parallel to the medium facing surface. In FIG. 32A to FIG. 34A and FIG. 32B to FIG. 34B, the portions closer to the substrate 1 than the encasing layer 12 are omitted.

Figures 34A, 34B:
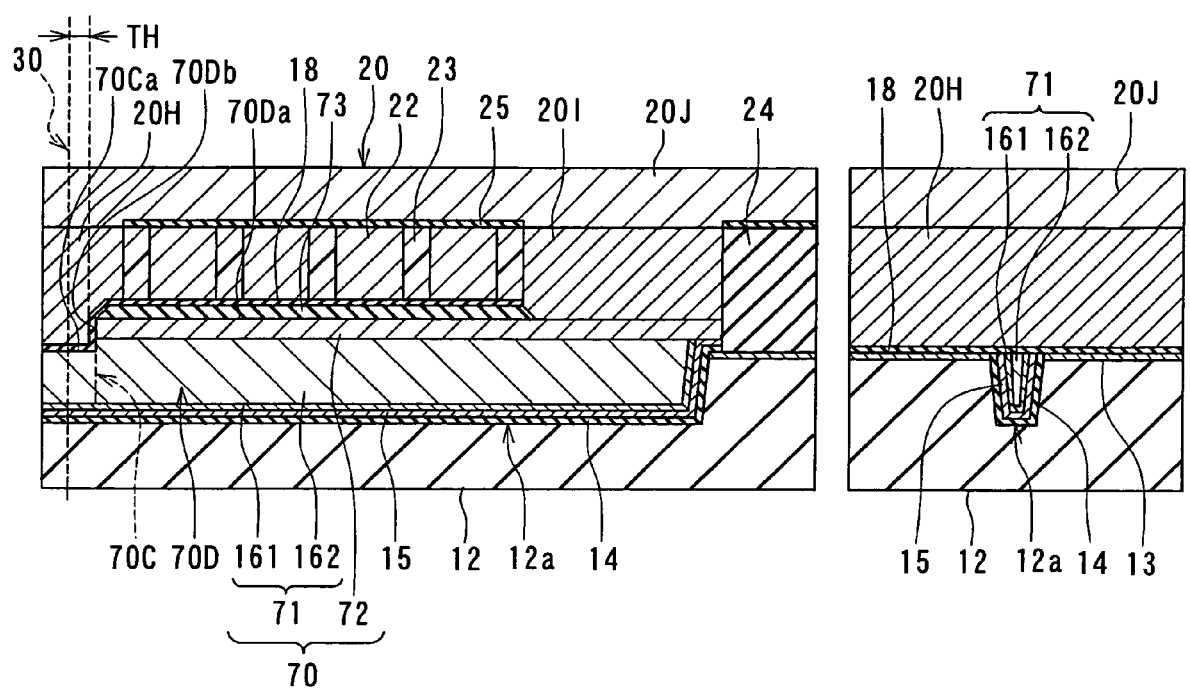
FIG. 34A and FIG. 34B are views for illustrating a step that follows the step shown in FIG. 33A and FIG. 33B.

Reference is now made to FIG. 34A and FIG. 34B to describe the configuration of the magnetic head of the fifth embodiment. The magnetic head of the embodiment comprises the pole layer 70 in place of the pole layer 16 of the first embodiment. The configuration of the pole layer 70 is the same as that of the third embodiment. FIG. 31A and FIG. 31B illustrate an example in which the front end face 70Db is nearly orthogonal to the top surface of the substrate 1. However, the front end face 70Db may be tilted with respect to the direction orthogonal to the top surface of the substrate 1 such that the thickness of the pole layer 70 gradually increases as the distance from the medium facing surface 30 increases in the region in which the front end face 70Db is located.

FIG. 34A and FIG. 34B illustrate the example in which the surface 70Ca is located closer to the substrate 1 than the interface between the lower layer 71 and the upper layer 72. In this case, the front end face 70Db is formed to extend from the upper layer 72 to the lower layer 71. However, the surface 70Ca may be located at a height the same as the height at which the interface between the lower layer 71 and the upper layer 72 is located, or may be located farther from the substrate 1 than the interface between the lower layer 71 and the upper layer 72. In these cases, the front end face 70Db is formed in the upper layer 72 only.

The magnetic head of the fifth embodiment comprises a nonmagnetic film 73 disposed on the surface 70Da of the second portion 70D of the pole layer 70 farther from the substrate 1. The material, thickness and forming method of the nonmagnetic film 73 are the same as those of the nonmagnetic film 61 of the second embodiment.

The shield layer 20 of the fifth embodiment is made up of the first layer 20H, the coupling layer 20I and the second layer 20J, as the shield layer 20 of the second embodiment. The first layer 20H has a portion located above the nonmagnetic film 73. The shield layer 20 has a portion that is sandwiched between the front end face 70Db and the medium facing surface 30 and that is located in a region closer to the substrate 1 than the surface 70Da of the second portion 70D of the pole layer 70 farther from the substrate 1. To be specific, this portion is a portion of the first layer 20H closer to the substrate 1 than the surface 70Da. In the fifth embodiment, the throat height TH is the distance between the medium facing surface 30 and the point at which the gap layer 18 first bends when seen from the medium facing surface 30, that is, the point at which the bottom surface of the first layer 20H first bends when seen from the medium facing surface 30.

Figures 32A, 32B:
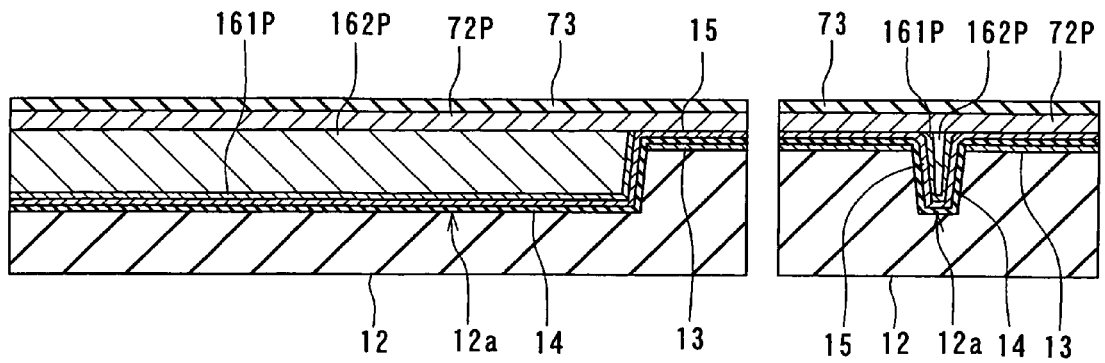
FIG. 32A and FIG. 32B are views for illustrating a step of a method of manufacturing a magnetic head of a fifth embodiment of the invention.

The method of manufacturing the magnetic head of the fifth embodiment will now be described. The method includes the steps up to the step of forming the magnetic layer 72P, as shown in FIG. 25A and FIG. 25B, the steps being the same as those of the third embodiment. FIG. 32A and FIG. 32B illustrate the following step. In the step, a nonmagnetic film 73 is formed by sputtering, for example, on the entire top surface of the layered structure.

Figures 33A, 33B:
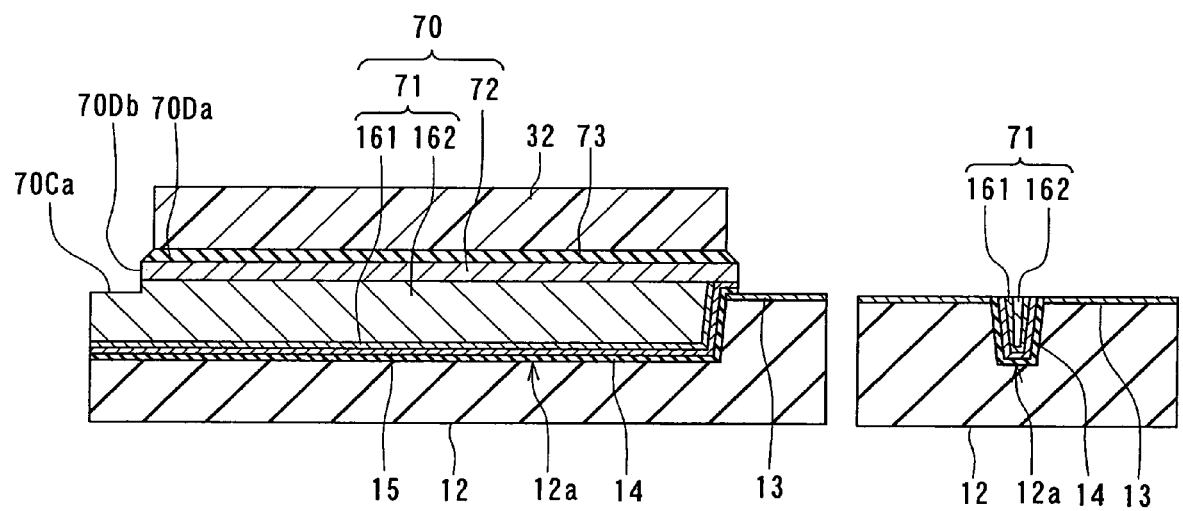
FIG. 33A and FIG. 33B are views for illustrating a step that follows the step shown in FIG. 32A and FIG. 32B.

FIG. 33A and FIG. 33B illustrate the following step. In the step, a photoresist layer having a thickness of 1.0 μm, for example, is formed on the entire top surface of the layered structure. The photoresist layer is then patterned to form the mask 32 for patterning the nonmagnetic film 73 and the magnetic layer 72P and etching portions of the magnetic layers 161P and 162P. The mask 32 has a plane geometry corresponding to the surface 70Da of the pole layer 70. Next, using the mask 32, a portion of the nonmagnetic film 73 is etched by reactive ion etching, for example. Next, using the mask 32, a portion of the magnetic layer 72P is etched by ion beam etching, for example, so as to pattern the magnetic layer 72P and to etch the portions of the magnetic layers 161P and 162P. As a result, the magnetic layers 161P and 162P are formed into the lower layer 71 made up of the first layer 161 and the second layer 162, and the magnetic layer 72P is formed into the upper layer 72. The surfaces 70Ca and 70Da and the front end face 70Db are formed in the pole layer 70 made up of the lower layer 71 and the upper layer 72. The etching is stopped at the level the same as that of the first embodiment. Next, the mask 32 is removed. Alternatively, the magnetic layer 72P may be patterned before the etching using the mask 32 is performed.

FIG. 34A and FIG. 34B illustrate the following step. In the step, first, the gap layer 18 is formed on the entire top surface of the layered structure. The material and forming method of the gap layer 18 are the same as those of the first embodiment. Next, a portion of the gap layer 18 away from the medium facing surface 30 is selectively etched to form an opening in the gap layer 18. Next, the first layer 20H of the shield layer 20 is formed on the gap layer 18, and the coupling layer 20I of the shield layer 20 is formed on a portion of the pole layer 70 where the opening of the gap layer 18 is formed. The first layer 20H is disposed not only in a region above the first portion 70C of the pole layer 70 but also in a region above a portion of the second portion 70D and a portion of the nonmagnetic film 73. Next, the coil 22 is formed by frame plating, for example, such that at least part of the coil 22 is disposed above the nonmagnetic layer 73. Alternatively, the first layer 20H and the coupling layer 20I may be formed after the coil 22 is formed.

Next, the insulating layer 23 made of photoresist, for example, is selectively formed around the coil 22 and in the space between the respective adjacent turns of the coil 22. Next, the insulating layer 24 having a thickness of 4 to 4.5 μm, for example, is formed on the entire top surface of the layered structure. Next, the insulating layer 24 is polished by CMP, for example, so that the first layer 20H, the coupling layer 20I and the coil 22 are exposed, and the top surfaces of the first layer 20H, the coupling layer 20I, the coil 22 and the insulating layers 23 and 24 are thereby flattened. Next, the insulating layer 25 is formed on the coil 22 and the insulating layers 23 and 24. Next, the second layer 20J is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

In the fifth embodiment, the gap layer 18 and the nonmagnetic film 73 are disposed between the pole layer 16 and the first layer 20H in the region farther from the medium facing surface 30 than the point at which the gap layer 18 first bends when seen from the medium facing surface 30. Consequently, flux leakage between the pole layer 16 and the shield layer 20 in this region is less, compared with the case in which the nonmagnetic film 73 is not provided. As a result, according to the embodiment, it is possible to introduce a magnetic flux of greater magnitude to the medium facing surface 30 and it is thereby possible to improve the overwrite property, as in the second embodiment.

In the fifth embodiment, as in the third embodiment, the pole layer 70 incorporates the lower layer 71 and the upper layer 72 that are stacked, and the upper layer 72 has a saturation flux density greater than that of the lower layer 71. According to the fifth embodiment, it is possible to introduce a magnetic flux of greater magnitude to the medium facing surface 30 through the pole layer 70, compared with the first embodiment. It is thereby possible to improve the overwrite property. The remainder of configuration, function and effects of the fifth embodiment are similar to those of the first embodiment.

It is possible to provide modification examples of the fifth embodiment that are similar to the first and second modification examples of the second embodiment and the first, second, sixth and seventh modification examples of the first embodiment.

The present invention is not limited to the foregoing embodiments but may be practiced in still other ways. For example, a coil wound around the pole layer 16 or 70 in a helical manner may be provided in any of the embodiments in place of the flat-whorl-shaped coils 9 and 22.

In the foregoing embodiments, at least a portion of the pole layer is formed in the groove 12a of the encasing layer 12. However, the pole layer of the invention is not limited to the one formed in such a manner but may be formed otherwise. For example, the pole layer may be formed by patterning a magnetic layer by etching, or may be formed by plating.

In the foregoing embodiments, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
a medium facing surface that faces toward a recording medium;
a coil for generating a magnetic field corresponding to data to be written on the recording medium;
a pole layer having an end face located in the medium facing surface, allowing a magnetic flux corresponding to the field generated by the coil to pass therethrough, and generating a write magnetic field for writing the data on the recording medium through the use of a perpendicular magnetic recording system;
a shield layer having an end face located in the medium facing surface and having a portion that is away from the medium facing surface and coupled to the pole layer;
a gap layer made of a nonmagnetic material and disposed between the pole layer and the shield layer;
an encasing layer made of a nonmagnetic material and having a groove that opens in a top surface thereof;
a nonmagnetic metal layer made of a nonmagnetic metal material, disposed on the top surface of the encasing layer, the nonmagnetic metal layer having a penetrating opening, the penetrating opening being through the nonmagnetic metal layer and contiguous to the groove, so that the nonmagnetic metal layer does not extend into the groove; and
a substrate on which the encasing layer, the nonmagnetic metal layer, the pole layer, the gap layer, the coil and the shield layer are stacked, wherein:
the pole layer has a portion that is placed in the groove of the encasing layer and in the opening of the nonmagnetic metal layer;
in the medium facing surface, the end face of the shield layer is located forward of the end face of the pole layer along a direction of travel of the recording medium with a specific space created by a thickness of the gap layer;
the pole layer incorporates: a first portion having the end face located in the medium facing surface; and a second portion that is located farther from the medium facing surface than the first portion and has a thickness greater than that of the first portion;
a surface of the first portion farther from the substrate is located closer to the substrate than a surface of the second portion farther from the substrate;
the second portion has a front end face that couples the surface of the first portion farther from the substrate to the surface of the second portion farther from the substrate;
the end face of the pole layer located in the medium facing surface has a first side close to the substrate, and a second side located opposite to the first side, the second side defining a track width; and
the shield layer incorporates a portion that is sandwiched between the front end face and the medium facing surface and that is located in a region closer to the substrate than the surface of the second portion farther from the substrate.

2. The magnetic head according to claim 1, wherein the end face of the pole layer located in the medium facing surface has a width that decreases as a distance from the first side decreases.

3. The magnetic head according to claim 1, wherein the first portion includes a portion having a width that does not change in accordance with a distance from the medium facing surface.

4. The magnetic head according to claim 1, wherein:
the gap layer touches the surface of the first portion farther from the substrate, the front end face, and the surface of the second portion farther from the substrate;

the shield layer incorporates: a first layer disposed adjacent to the gap layer; and a second layer disposed on a side of the first layer opposite to the gap layer; and the first layer has a portion located above the second portion, and has a bottom surface that bends to face toward the surface of the first portion farther from the substrate, the front end face, and the surface of the second portion farther from the substrate, with the gap layer disposed between the bottom surface of the first layer and each of the surface of the first portion, the front end face, and the surface of the second portion.

5. The magnetic head according to claim 1, wherein:

the shield layer incorporates: a first layer disposed adjacent to the gap layer; and a second layer disposed on a side of the first layer opposite to the gap layer; and the first layer is located only in a region above the first portion of the pole layer.

6. The magnetic head according to claim 1, further comprising a nonmagnetic film made of a nonmagnetic material and disposed on the surface of the second portion farther from the substrate, wherein:

the shield layer incorporates: a first layer disposed adjacent to the gap layer; and a second layer disposed on a side of the first layer opposite to the gap layer; and the first layer has a portion located above the nonmagnetic film.

7. The magnetic head according to claim 1, wherein the pole layer has a lower layer and an upper layer that are stacked, and the upper layer has a saturation flux density that is greater than that of the lower layer.

8. The magnetic head according to claim 7, wherein the front end face is formed to extend from the upper layer to the lower layer.

9. The magnetic head according to claim 7, further comprising a nonmagnetic film made of a nonmagnetic material and disposed on the surface of the second portion farther from the substrate, wherein:

the shield layer incorporates: a first layer disposed adjacent to the gap layer; and a second layer disposed on a side of the first layer opposite to the gap layer; and the first layer has a portion located above the nonmagnetic film.

10. The magnetic head according to claim 1, wherein:

the end face of the pole layer located in the medium facing surface has a first region and a second region connected to the first region and located farther from the substrate than the first region;

the first region has a width that decreases as a distance from the substrate decreases;

the second region has a uniform width that defines the track width; and in the medium facing surface, the nonmagnetic metal layer exists on both sides of the second region, the sides being opposed to each other in a direction of track width.

11. The magnetic head according to claim 1, further comprising a yoke layer touching the surface of the second portion farther from the substrate, wherein an end of the yoke layer closer to the medium facing surface is located farther from the medium facing surface than a boundary between the front end face and the surface of the second portion farther from the substrate.

12. A method of manufacturing a magnetic head for perpendicular magnetic recording, the magnetic head comprising:

a medium facing surface that faces toward a recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium through the use of a perpendicular magnetic recording system;

a shield layer having an end face located in the medium facing surface and having a portion that is away from the medium facing surface and coupled to the pole layer;

a gap layer made of a nonmagnetic material and disposed between the pole layer and the shield layer;

an encasing layer made of a nonmagnetic material and having a groove that opens in a top surface thereof;

a nonmagnetic metal layer made of a nonmagnetic metal material, disposed on the top surface of the encasing layer, the nonmagnetic metal layer having a penetrating opening, the penetrating opening being through the nonmagnetic metal layer and contiguous to the groove, so that the nonmagnetic metal layer does not extend into the groove; and a substrate on which the encasing layer, the nonmagnetic metal layer, the pole layer, the gap layer, the coil and the shield layer are stacked, wherein:

the pole layer has a portion that is placed in the groove of the encasing layer and in the opening of the nonmagnetic metal layer;

in the medium facing surface, the end face of the shield layer is located forward of the end face of the pole layer along a direction of travel of the recording medium with a specific space created by a thickness of the gap layer;

the pole layer incorporates: a first portion having the end face located in the medium facing surface; and a second portion that is located farther from the medium facing surface than the first portion and has a thickness greater than that of the first portion;

a surface of the first portion farther from the substrate is located closer to the substrate than a surface of the second portion farther from the substrate;

the second portion has a front end face that couples the surface of the first portion farther from the substrate to the surface of the second portion farther from the substrate;

the end face of the pole layer located in the medium facing surface has a first side close to the substrate, and a second side located opposite to the first side, the second side defining a track width; and the shield layer incorporates a portion located between the front end face and the medium facing surface in a region closer to the substrate than the surface of the second portion farther from the substrate, the method comprising the steps of:

forming the pole layer;

forming the gap layer on the pole layer;

forming the shield layer on the gap layer; and forming the coil.

13. The method according to claim 12, wherein the step of forming the pole layer includes the steps of:

forming a magnetic layer that will be formed into the pole layer by polishing and etching later;

polishing a top surface of the magnetic layer; and etching a portion of the magnetic layer such that the first and second portions are formed and the magnetic layer is thereby formed into the pole layer.

14. The method according to claim 13, wherein chemical mechanical polishing is employed in the step of polishing.

15. The method according to claim 13, wherein ion beam etching is employed in the step of etching.

16. The method according to claim 13, further comprising the steps of: forming the encasing layer; and forming a polishing stopper layer around the groove in a region higher than the top surface of the encasing layer, the polishing stopper layer indicating a level at which polishing of the step of polishing is stopped, wherein:
in the step of forming the magnetic layer, the magnetic layer is formed such that the groove of the encasing layer is filled with the magnetic layer and that the top surface of the magnetic layer is located higher than a top surface of the polishing stopper layer; and
the step of polishing is performed such that the top surface of the magnetic layer is polished until a portion of the magnetic layer located higher than the top surface of the polishing stopper layer is removed.

17. The method according to claim 16, wherein the step of forming the encasing layer includes the steps of:
forming a nonmagnetic layer that will be formed into the encasing layer by forming the groove therein later;
forming the nonmagnetic metal layer on a top surface of the nonmagnetic layer; and
forming the groove in the nonmagnetic layer by selectively etching a portion of the nonmagnetic layer exposed from the opening of the nonmagnetic metal layer so that the nonmagnetic layer is formed into the encasing layer, and wherein:
in the step of forming the polishing stopper layer, the polishing stopper layer is formed in a region higher than a top surface of the nonmagnetic metal layer;
in the step of forming the magnetic layer, the magnetic layer is formed such that the groove of the encasing layer and the opening of the nonmagnetic metal layer are filled with the magnetic layer and that the top surface of the magnetic layer is located higher than the top surface of the polishing stopper layer; and
in the step of etching the portion of the magnetic layer, etching is performed such that the second side is located at a height that falls within a range between a height at which the top surface of the nonmagnetic metal layer as initially formed is located and a height at which a bottom surface thereof is located.

18. The method according to claim 13, wherein: the end face of the pole layer located in the medium facing surface has a first region and a second region connected to the first region and located farther from the substrate than the first region; the first region has a width that decreases as a distance from the substrate decreases; and the second region has a uniform width that defines the track width, the method further comprising the steps of:
forming a nonmagnetic layer that will be formed into the encasing layer by forming the groove therein later;
forming the nonmagnetic metal layer on a top surface of the nonmagnetic layer; and
forming the groove in the nonmagnetic layer by selectively etching a portion of the nonmagnetic layer exposed from the opening of the nonmagnetic metal layer, so that the nonmagnetic layer is formed into the encasing layer, wherein:
in the step of forming the magnetic layer, the magnetic layer is formed such that the groove of the encasing layer and the opening of the nonmagnetic metal layer are filled with the magnetic layer and that the top surface of the magnetic layer is located higher than a top surface of the nonmagnetic metal layer; and
in the step of etching the portion of the magnetic layer, etching is performed such that the second side is located at a height that falls within a range between a height at which the top surface of the nonmagnetic metal layer as initially formed is located and a height at which a bottom surface thereof is located.

19. The method according to claim 12, wherein:
the pole layer incorporates a lower layer and an upper layer that are stacked; and
the step of forming the pole layer includes the steps of:
forming a magnetic layer for the lower layer that will be formed into the lower layer by polishing and etching later;
polishing a top surface of the magnetic layer for the lower layer;
forming a magnetic layer for the upper layer that will be the upper layer later on the magnetic layer for the lower layer polished; and
etching a portion of the magnetic layer for the lower layer by using the magnetic layer for the upper layer as a mask, so that the magnetic layer for the lower layer is formed into the lower layer and the magnetic layer for the upper layer is formed into the upper layer.

20. The method according to claim 19, wherein chemical mechanical polishing is employed in the step of polishing.

21. The method according to claim 19, wherein the magnetic layer for the upper layer is formed by frame plating.

22. The method according to claim 19, wherein ion beam etching is employed in the step of etching.

23. The method according to claim 19, further comprising the steps of: forming the encasing layer; and forming a polishing stopper layer around the groove in a region higher than the top surface of the encasing layer, the polishing stopper layer indicating a level at which polishing of the step of polishing is stopped, wherein:
in the step of forming the magnetic layer for the lower layer, the magnetic layer for the lower layer is formed such that the groove of the encasing layer is filled with the magnetic layer for the lower layer and that the top surface of the magnetic layer for the lower layer is located higher than a top surface of the polishing stopper layer; and
the step of polishing is performed such that the top surface of the magnetic layer for the lower layer is polished until a portion of the magnetic layer for the lower layer located higher than the top surface of the polishing stopper layer is removed.

24. The method according to claim 23, wherein the step of forming the encasing layer includes the steps of:
forming a nonmagnetic layer that will be formed into the encasing layer by forming the groove therein later;
forming the nonmagnetic metal layer on a top surface of the nonmagnetic layer; and
forming the groove in the nonmagnetic layer by selectively etching a portion of the nonmagnetic layer exposed from the opening of the nonmagnetic metal layer, so that the nonmagnetic layer is formed into the encasing layer, and wherein:
in the step of forming the polishing stopper layer, the polishing stopper layer is formed in a region higher than a top surface of the nonmagnetic metal layer;
in the step of forming the magnetic layer for the lower layer, the magnetic layer for the lower layer is formed such that the groove of the encasing layer and the opening of the nonmagnetic metal layer are filled with the magnetic layer for the lower layer and that the top surface of the magnetic layer for the lower layer is located higher than the top surface of the polishing stopper layer; and in the step of etching the portion of the magnetic layer for the lower layer, etching is performed such that the second side is located at a height that falls within a range between a height at which the top surface of the nonmagnetic metal layer as initially formed is located and a height at which a bottom surface thereof is located.

25. The method according to claim 19, wherein: the end face of the pole layer located in the medium facing surface has a first region and a second region connected to the first region and located farther from the substrate than the first region; the first region has a width that decreases as a distance from the substrate decreases; and the second region has a uniform width that defines the track width, the method further comprising the steps of:

forming a nonmagnetic layer that will be formed into the encasing layer by forming the groove therein later;

forming the nonmagnetic metal layer on a top surface of the nonmagnetic layer; and forming the groove in the nonmagnetic layer by selectively etching a portion of the nonmagnetic layer exposed from the opening of the nonmagnetic metal layer, so that the nonmagnetic layer is formed into the encasing layer, wherein:

in the step of forming the magnetic layer for the lower layer, the magnetic layer for the lower layer is formed such that the groove of the encasing layer and the opening of the nonmagnetic metal layer are filled with the magnetic layer for the lower layer and that the top surface of the magnetic layer for the lower layer is located higher than a top surface of the nonmagnetic metal layer; and in the step of etching the portion of the magnetic layer for the lower layer, etching is performed such that the second side is located at a height that falls within a range between a height at which the top surface of the nonmagnetic metal layer as initially formed is located and a height at which a bottom surface thereof is located.

26. The method according to claim 12, further comprising the step of forming a nonmagnetic film made of a nonmagnetic material and disposed on the surface of the second portion farther from the substrate, wherein:

the shield layer incorporates: a first layer disposed adjacent to the gap layer; and a second layer disposed on a side of the first layer opposite to the gap layer; and the first layer has a portion located above the nonmagnetic film.

27. The method according to claim 12, further comprising the step of forming a yoke layer touching the surface of the second portion farther from the substrate, wherein an end of the yoke layer closer to the medium facing surface is located farther from the medium facing surface than a boundary between the front end face and the surface of the second portion farther from the substrate.

28. The method according to claim 12, wherein the gap layer is formed by chemical vapor deposition in which formation of a single atomic layer is repeated.

* * * * *

UNITED STATES PATENT AND TRADEMARK OFFICE
CERTIFICATE OF CORRECTION

PATENT NO.      : 7,663,839 B2                                Page 1 of 1
APPLICATION NO. : 11/129377
DATED           : February 16, 2010
INVENTOR(S)     : Sasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this

Thirtieth Day of November, 2010

David J. Kappos
*Director of the United States Patent and Trademark Office*